(12) United States Patent
Biswas et al.

(10) Patent No.: US 8,184,200 B1
(45) Date of Patent: May 22, 2012

(54) PICTURE RATE CONVERSION SYSTEM FOR HIGH DEFINITION VIDEO

(75) Inventors: Mainak Biswas, Santa Cruz, CA (US); Vipin Namboodiri, Bangalore (IN)

(73) Assignee: Marvell International Ltd. (BM)

( * ) Notice: Subject to any disclaimer, the term of this patent is extended or adjusted under 35 U.S.C. 154(b) by 623 days.

(21) Appl. No.: 12/400,220

(22) Filed: Mar. 9, 2009

Related U.S. Application Data

(60) Provisional application No. 61/046,922, filed on Apr. 22, 2008, provisional application No. 61/051,782, filed on May 9, 2008, provisional application No. 61/059,524, filed on Jun. 6, 2008.

(51) Int. Cl.
*H04N 7/01* (2006.01)
*H04N 11/20* (2006.01)

(52) U.S. Cl. ............... 348/459; 348/452; 348/443

(58) Field of Classification Search ........... 348/441–459
See application file for complete search history.

(56) References Cited

U.S. PATENT DOCUMENTS

| | | | |
|---|---|---|---|
| 6,005,916 A | 12/1999 | Johnson et al. | |
| 7,197,074 B2 * | 3/2007 | Biswas et al. | 375/240.16 |
| 7,684,846 B2 | 3/2010 | Johnson et al. | |
| 7,841,982 B2 | 11/2010 | Johnson et al. | |
| 2007/0070250 A1 * | 3/2007 | Zhou et al. | 348/607 |

OTHER PUBLICATIONS

Office Action issued by the USPTO dated Dec. 23, 2010 for U.S. Appl. No. 12/400,207.

* cited by examiner

*Primary Examiner* — Michael Lee

(57) ABSTRACT

Systems and methods for converting a picture frame rate between a source video at a first rate and a target video at a second rate. A system may include a phase plane correlation calculator configured to determine a first motion vector estimate. The system may further include a global motion calculator configured to determine a second motion vector estimate based on the previous frame data, the current frame data, and the first motion vector estimate. The system may also include a motion compensated interpolator for assigning a final motion vector through a quality calculation and an intermediate frame generator for generating the intermediate frame using the final motion vector.

19 Claims, 21 Drawing Sheets

PICTURE RATE CONVERSION SYSTEM FOR HIGH DEFINITION VIDEO

This application claims the benefit of U.S. Provisional Application No. 61/051,782, filed 9 May 2008; U.S. Provisional Application No. 61/046,922, filed 22 Apr. 2008; and U.S. Provisional Application No. 61/059,524, filed 6 Jun. 2008, all of which are herein incorporated in their entirety by reference. This application is related to U.S. Non-provisional application Ser. No. 12/400,207, entitled "Filter Bank Based Phase Correlation Architecture for Motion Estimation" filed on the same day as this application and U.S. Non-provisional application Ser. No. 12/400,227, entitled "Picture Rate Conversion System Architecture," also filed on the same day as this application.

FIELD

The technology described in this patent document relates generally to the field of picture rate conversion, and more particularly to motion compensated picture rate conversion.

BACKGROUND

Typical movie films are recorded at 24 Hz, 25 Hz or 30 Hz. Picture rates of common video cameras are 50 Hz and 60 Hz. Commercially available television displays, on the other hand, have picture rates up to and beyond 120 Hz, and employ either progressive or interlaced scanning. Hence, to interface broadcast video with a high-end TV display, the original sequence from the broadcast video needs to be up-converted using, for example, a picture rate converter. A picture rate converter typically operates by interpolating image frames at time instances where the frame sequence from a lower-frequency source device has yet to be registered in a higher-frequency destination display.

In simple picture rate converters, a picture is often repeated in the destination display until the next picture arrives from the source device, which oftentimes results in blur and judder when motion occurs. Motion estimation and compensation circuits may be used in a picture rate converter to reduce these unwanted effects and achieve a high performance conversion for moving sequences. Motion compensation operates by estimating where elements of an interpolated picture would be, based on the direction and speed of the movement of those elements. The direction and speed values may then be expressed as motion vectors and are used to "move" the elements to the correct position in the newly interpolated frame. If this technique is applied correctly, its impact may be immediately visible on any picture sequence involving motion, where the resulting pictures can hardly be distinguished from the original sequences before the up-conversion.

It is thus desirable to provide methods and systems that minimize computational cost associated with motion-compensated picture rate conversion while maximizing its estimation accuracy.

SUMMARY OF THE INVENTION

In accordance with the teachings provided herein, systems and methods are provided for picture frame rate conversion between a source video and a target video. As an example, a system may include a phase plane correlation configured to determine a first motion vector estimate. A global motion calculator may be included for determining a second motion vector estimate based on the previous frame data, the current frame data, and the first motion vector estimate. At least one of the first motion vector and the second motion vector are used in interpolating the intermediate frame. A motion compensated interpolator may assign a final motion vector through a quality calculation that utilizes data from the first motion vector estimate and the second motion vector estimate, and an intermediate frame generator may generate the intermediate frame utilizing the final motion vector.

A global motion calculator may include an initial estimator that generates a global parameter estimate based on the first motion vector estimate and a parameter refiner that refines the global parameter estimate where the refined global parameter estimate is used to generate the second motion vector estimate. A global motion calculator may also be configured to select a plurality of pixel groups at random from the previous frame data and corresponding current frame data that exhibit high levels of activity. The global motion calculator may be configured to calculate one or more motion parameters for each retained pixel group corresponding to movement of the pixel group and generate a second motion vector estimate based on the calculated parameter, wherein the global motion calculator may use the first motion vector estimate as an initial guess in an affine model that may be represented as: $X'=A*X+B$, where $X=[x,y]^T$ represents a position of a selected pixel group in the previous frame, where $X'=[x',y']^T$ represents a position of a selected pixel group in the current frame, where $$A = \begin{bmatrix} a_{11} & a_{12} \\ a_{21} & a_{22} \end{bmatrix}$$

represents motion parameters corresponding to zoom and rotation of the selected pixel group from the previous frame to the current frame, and where $B=[b_x, b_y]^T$ represents motion parameters corresponding to pan motion of the pixel group from the previous frame to the current frame.

A phase plane correlation calculator may include a fast Fourier transform calculator for performing a fast Fourier transform on the previous frame data and the current frame data to generate frequency-domain representations. The phase plane correlation calculator may also include a phase difference calculator for determining a phase difference between the frequency-domain representations and an inverse fast Fourier transform calculator for performing an inverse fast Fourier transform on the phase difference to generate a phase correlation surface. A peak identifier may identify peaks on the phase correlation surface to generate a motion vector estimate through a motion vector estimate generator.

A phase plane correlation calculator may also include a low pass filter for generating low pass representations of the previous frame data and current frame data as well as a high pass filter for generating high pass representations of the previous frame data and current frame data, wherein the fast Fourier transform calculator, the phase difference calculator, the inverse fast Fourier transform calculator, the peak identifier, and the motion vector estimate generator are configured to operate on the low pass and high pass representations to generate the first motion vector estimate.

The motion compensated interpolator may be configured to optimize a cost function having a distortion measure term and a smoothness term, wherein the distortion measure term uses the first motion vector estimate, the second motion vector estimate, and motion vector estimates from neighboring frame-blocks. The cost function may be represented as: Cost $(x,y,t) = \alpha f(\text{Data}) + \beta f(\text{smoothness})$, where $f(\text{Data}) = \Sigma |I_1(x, y, t_1) - I_2(x-dx_t, y-dy_t, t_2)|$ over each motion vector estimate input.

A system for converting a picture frame rate may also include an error corrector for concealing edge errors in the intermediate frame. The error corrector may be configured to interpolate edges in portions of the intermediate frame deemed to contain errors, and the error corrector may be further configured to fill in non-edge portions of the intermediate frame deemed to contain errors using a Markovian Model based texture synthesis. A system for converting a picture frame rate may also include a final image synthesizer configured to decide whether to insert the interpolated intermediate frame or to repeat the previous frame in the target video.

As a further example, a method of picture frame rate conversion between a source video and a target video may include receiving previous frame data and current frame data and performing a phase plane correlation calculation utilizing the previous frame data and the current frame data to determine a first motion vector estimate. A global motion computation may be performed utilizing the previous frame data, the current frame data, and the first motion vector estimate to determine a second motion vector estimate. A motion compensated interpolation may be performed to assign a final motion vector through a quality calculation that utilizes data from the first motion vector estimate and the second motion vector estimate. The intermediate frame may be generated utilizing the previous frame data and the final motion vector.

DETAILED DESCRIPTION

Figure 1:
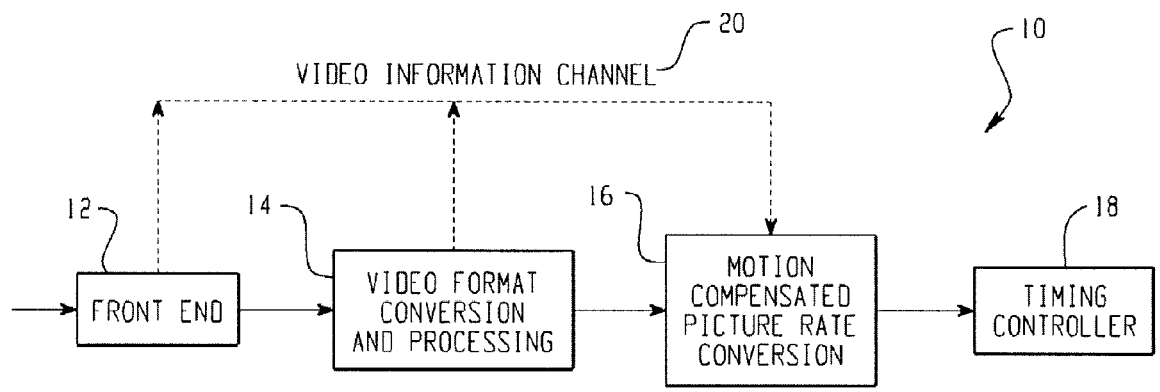
FIG. 1 is a block diagram illustrating a motion compensated picture rate converter (MCPRC) system configuration.

FIG. 1 is a block diagram illustrating a motion compensated picture rate converter (MCPRC) system configuration 10. An input signal, having a discrete sequence of video frames, is input to the MCPRC system 10, which produces an up-converted, motion compensated output signal via modules 12, 14, 16, and 18 of the MCPRC system 10. Each of the modules of MCPRC system 10 is described herein. Subsequent to the up-conversion, the output signal from the MCPRC system 10 has a frame rate that is typically higher than the frame rate of the input signal. For example, the input signal may be produced from a video camera which has a picture rate of 60 Hz. This video signal may need to be up-converted using the MCPRC system 10 in order to be suitable for output on an LCD panel display having, for example, a refresh rate of 120 Hz. In general, frame rate up-conversion is achieved by injecting a pre-determined number of frames between every pair of temporally adjacent input frames. These intermediate frames may be created to approximately capture motion trajectories of objects between frames, thereby enhancing the overall smoothness of a video image sequence as it is displayed after up-conversion.

With reference to FIG. 1, the input signal is first processed by a front end module 12. The front end module 12 may contain components such as tuners, demodulators, converters, codecs, analog video decoders, etc. An output from the front end module 12 is then passed downstream to a video format conversion and processing module 14 which may apply additional video enhancements such as reducing analog noise and compression artifacts, scaling, OSD blending, color management, etc. The resulting output is subsequently fed to a motion compensated picture rate conversion (MCPRC) module 16 producing an output that is processed by a timing controller 18 before being propagated as an output signal.

The entire MCPRC system 10 illustrated in FIG. 1 may be implemented on a single chip. In one example, an MCPRC chip may be incorporated into television circuitry where an up-converted, post-processed output of the MCPRC system is transmitted to an external display panel for video. However, the MCPRC architecture 10 of FIG. 1 may also be implemented on a plurality of chips wherein the front end 12 and video format conversion and processing module 14 are fabricated on one chip and a motion compensated picture rate conversion module 16 and timing controller 18 are fabricated on a separate chip. Additional chip combinations of the elements of FIG. 1 may also be implemented.

Figure 2:
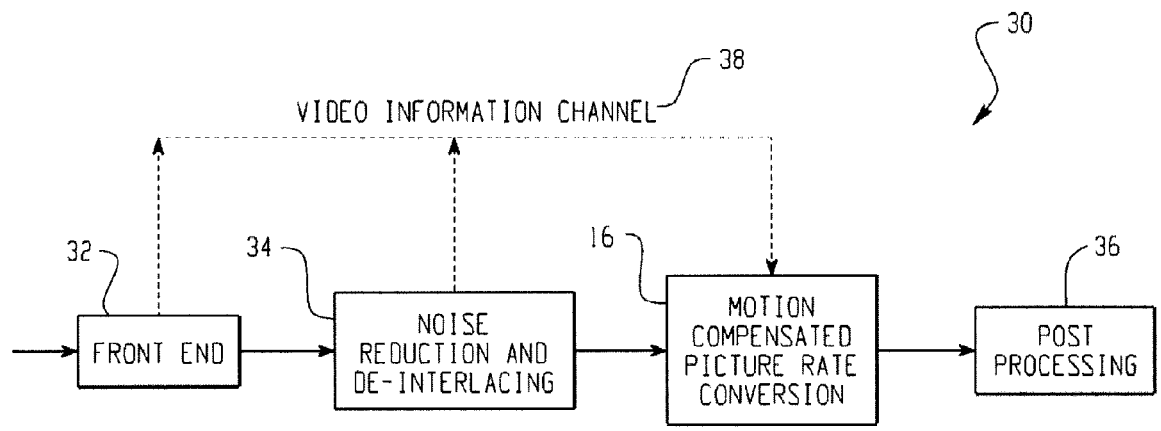
FIG. 2 is a block diagram illustrating another MCPRC system configuration.

FIG. 2 is a block diagram illustrating another MCPRC system configuration 30. In the configuration of FIG. 2, some of the processing of the video format conversion and processing module 14 of FIG. 1 has been moved to a post processing module 36. In this arrangement, an input signal is received by a front end module 32. The front end module 32 may contain components such as tuners, demodulators, converters, codecs, analog video decoders, etc. An output from the front end module 32 is passed downstream to a noise reduction and de-interlacing module 34 which may, for example, convert the input signal from a native interlace scan-based form to a high quality progressive scan output while realizing a significant reduction in analog noise and compression artifacts such as block noise and mosquito noise. The resulting output may be subsequently fed to a motion compensated picture rate conversion module 16, which generates motion compensated interpolated frames to produce a video output sequence. The MCPRC module 16 will be described below in further operational detail. The video output is then processed by a post-processing module 36 that may apply additional video enhancement functions to the video signal, such as scaling, edge enhancement, color management, picture controls, etc.

Like the configuration of FIG. 1, the example of FIG. 2 may be implemented on a single chip or a plurality of chips. The post processing module 36 may be included on the same chip as the MCPRC 16 or may be used as a separate chip in the FIG. 2 architecture, for example. In certain configurations, modules 32, 34, 16, and 36 are structurally similar to their counterpart modules 12, 14, 16 and 18 of FIG. 1.

As illustrated in FIGS. 1 and 2, video information channels 20 and 38, respectively, are provided to facilitate the transfer of information between the modules in the corresponding MCPRC systems 10 and 30. In particular, information that may be conveyed to the MCPRC modules 16 includes, for example, the position of a closed caption display, the presence of an on-screen display, the native frame rate of the respective input signals, and the origin and active video boundaries of respective input signals.

In the illustrated MCPRC systems 10 and 30, the input video signals may range from Standard Definition (NTSC/PAL/SECAM) to High Definition and may be interlaced or progressive-based. In some instances, the video signal resolution is even lower than Standard Definition with low frame rates. For example, the input video signal may be a QVGA (320×240) input at 15 or 30 frames per second from a connector device in a portable media player such as an iPod. In certain instances, the low-resolution video signal may be fed to a video dock in a personal media player or a multimedia cellular phone via a connector device, where the dock may contain an integrated circuit capable of performing spatial and temporal conversions from, for example, 320×160 at 5 fps to 720×480 at 60 fps. Interlaced inputs may be composed of video-originated or film-originated material. Video-originated material may be first de-interlaced and converted from a field rate to a frame rate before being input to MCPRC modules 16.

Figure 3:
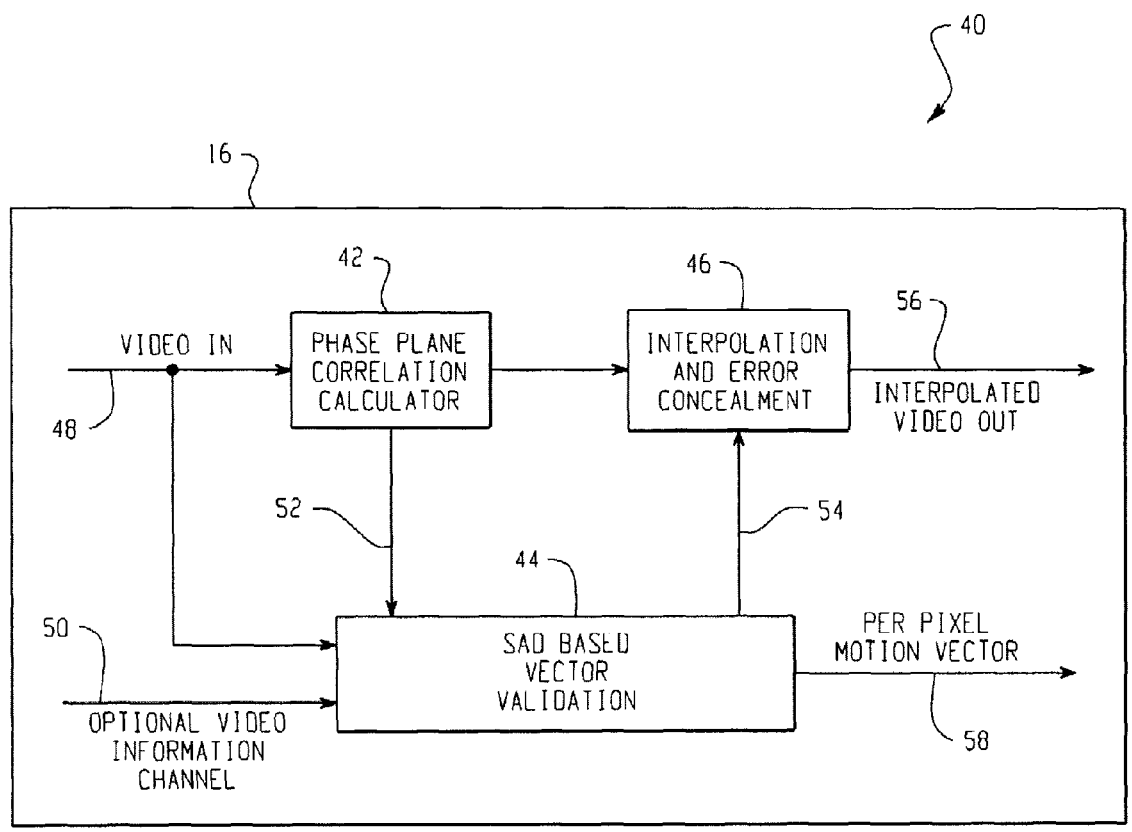
FIG. 3 is a block diagram illustrating a motion compensated picture rate converter including a phase plane correlation calculator.

FIG. 3 is a block diagram illustrating a motion compensated picture rate conversion module including a phase plane correlation calculator that may be integrated as module 16 in the configurations of FIGS. 1 and 2, respectively, for providing object motion estimation between pairs of consecutive frames in an input video signal 48. For each pair of consecutive frames to be interpolated, the earlier of the two frames is referred to as a "previous frame," and the latter of the frames is referred to as a "current frame."

In FIG. 3, the input video signal 48 is processed by a phase plane correlation calculator 42. The phase plane correlation module 42 determines a motion vector estimate 52 that is provided to an SAD based vector validation module 44. The SAD based vector validation module 44 also may receive a copy of the input video signal 48 and a video information channel 50. The SAD based vector validation module 44 determines a per pixel motion vector 54, 58 based upon the motion vector estimate 52 from the phase plane correlation calculator 42 and may consider other motion vector inputs (not shown) in that determination. The per pixel motion vectors are received by an interpolation and error concealment module 46 where intermediate frames are generated for insertion into a target video.

Figure 4A:
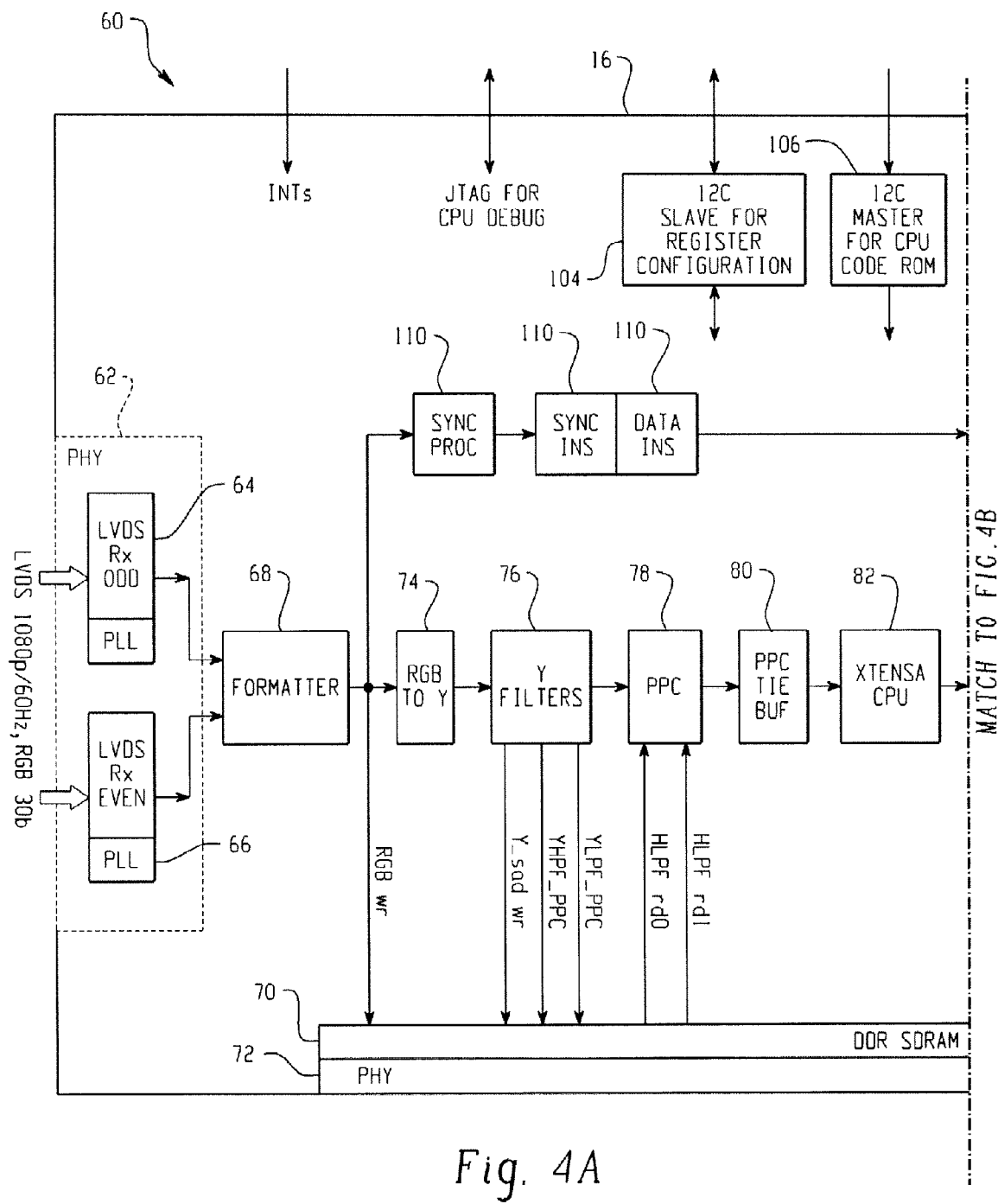
FIGS. 4A and 4B depict a block diagram illustrating components of an example MCPRC system.
Figure 4B:
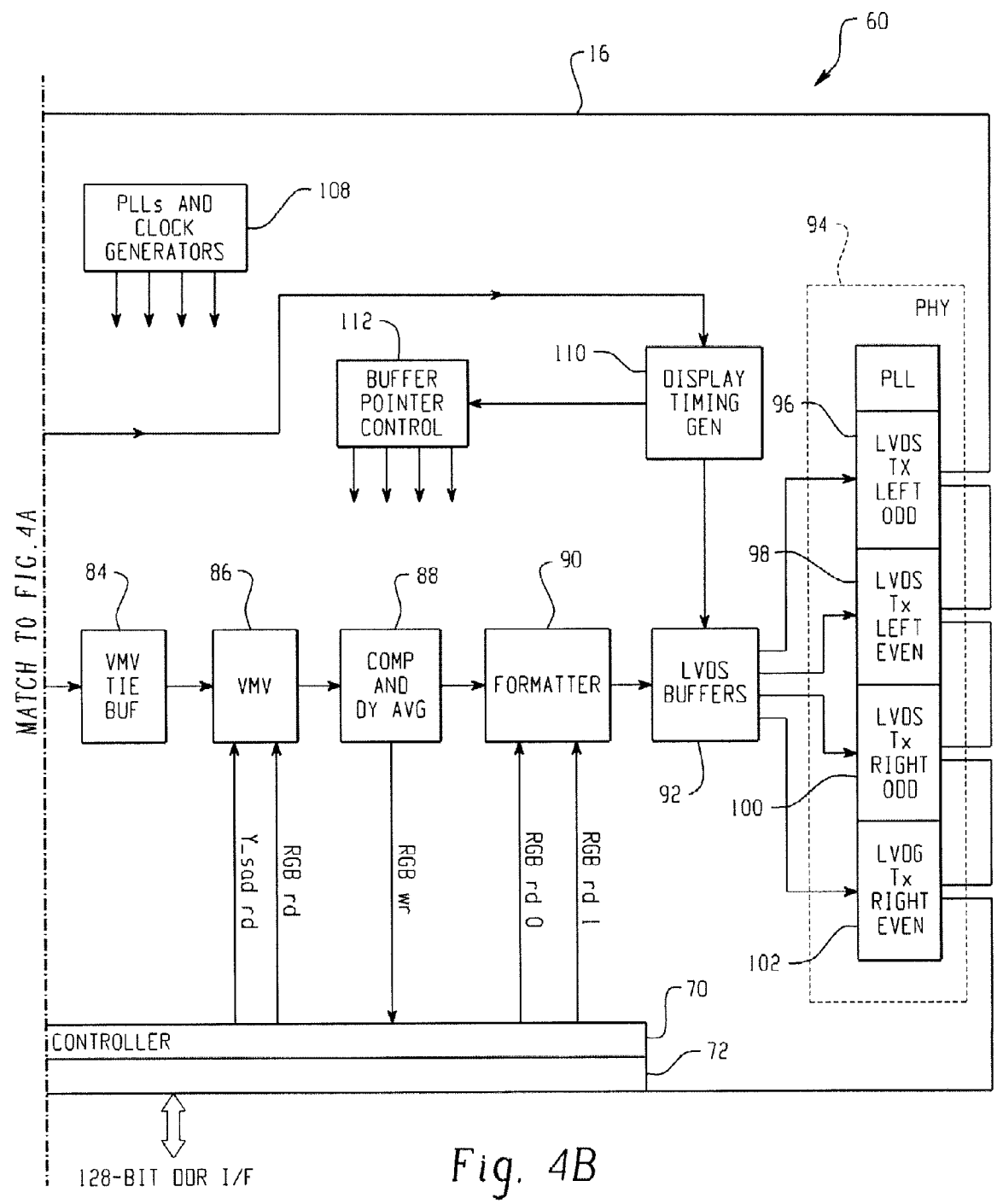

FIGS. 4A and 4B depict a block diagram illustrating components of an example MCPRC system 60. In the MCPRC system 60 of FIG. 4, a two-channel LVDS input receiver 62 receives a two-channel LVDS input signal and provides the input signal to a formatter 68 that executes deserializing operations. The formatter 68 passes a deserialized output to physical memory 72 via a DDR SDRAM controller 70. The formatter 68 may also provide the deserialized output to an RGB to luminance converter 74. A pair of luminance filters 76 receive the converted signal from the RGB to luminance converter 74. The luminance filters 76 decompose the received signal into a low pass representation and a high pass representation of the received input signal. The low pass representation (YLPF_PPC) and the high pass representation (YHPF_PPC) are provided to the physical memory 72 via the DDR SDRAM controller 70 for storage.

Following storage of the low pass and high pass representations of the input signal, a phase plane correlation calculator (PPC) 78 accesses the filtered representations of the input signals and performs a phase plane correlation calculation on the filtered data. In performing the phase plane correlation calculation, the PPC 78 may utilize a buffer 80 and a processing unit 82 such as an Xtensa™ CPU. The PPC 78 and processing unit 82 perform a phase plane correlation calculation on the filtered representations of the input signal to produce one or more candidate motion vectors. The candidate motion vectors may be stored in a validate motion vector (VMV) buffer 84 prior to access by a VMV engine 86.

The VMV engine 86 receives candidate motion vectors from the VMV buffer 84 as well as previous frame data and current frame data from physical memory 72 via the DDR SDRAM controller 70. The VMV engine 86 determines a final motion vector to be used in generating one or more intermediate frames by comparing the candidate motion vectors stored in the VMV buffer 84 to the received previous frame data and current frame data. For example, the VMV engine 86 may perform a quality calculation for each of the candidate motion vectors and select the candidate motion vector having a best score relating to the accuracy of the candidate motion vector in depicting object motion from the previous frame to the current frame while offering a high degree of picture smoothness. Following selection of a final motion vector based on the quality calculation, the VMV engine 86 generates one or more intermediate frames based on the selected final motion vector for insertion into the final up-converted target video.

Figure 19:
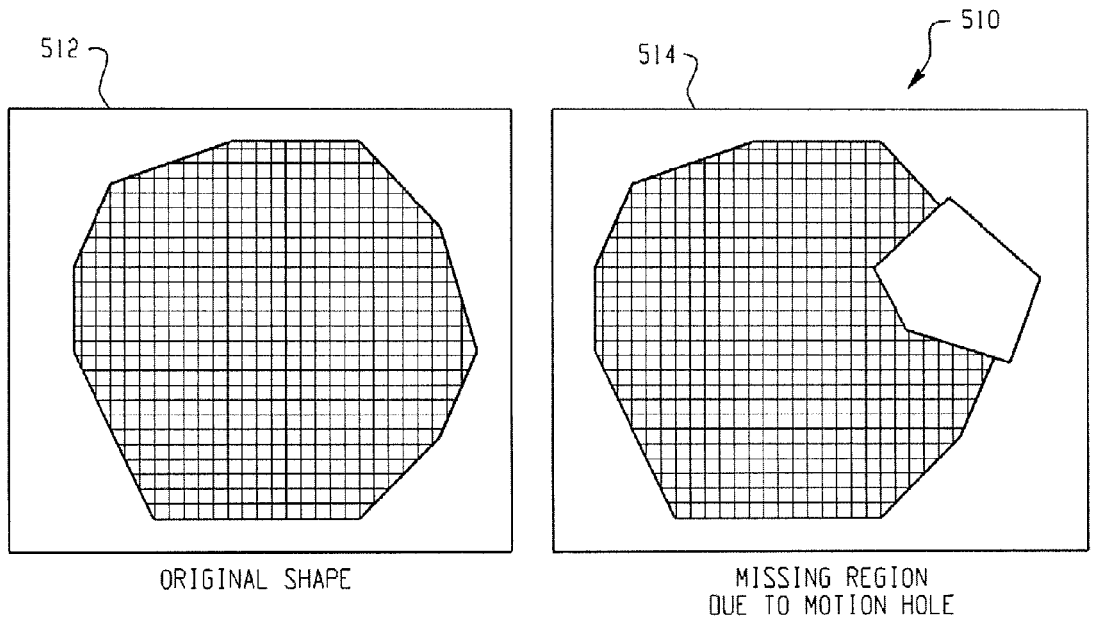
FIG. 19 is an illustration of a motion hole.

In calculating motion vectors for integrating intermediate frames for up-conversion of video, some portions of the intermediate frame may be undefined by the final motion vectors selected by the VMV engine 86. This anomaly in motion based interpolation often occurs at edges of objects appearing in the video. This phenomenon is illustrated in FIG. 19, which will be discussed in further detail below. To account for these undefined regions, the MCPRC system 60 may include a compensation and dynamic averager 88. The compensation and dynamic averager 88 receives intermediate frames generated by the VMV engine 86 and performs error correction techniques on the intermediate frames. These error correction techniques fill in the portions of the intermediate frames left undefined by the frame generation procedures as will be described in detail below. The compensation and dynamic averager 88 processes the intermediate frames and outputs the error corrected intermediate frames to physical memory 72.

Following generation of the intermediate frames and error correction, a second formatter 90 reads the target video, which includes previous frame data, current frame data, and the generated intermediate frames, and converts them into the desired output format. In the example of FIG. 4, the formatted output is then propagated to LVDS buffers 92 which output the target video in a quad-channel LVDS configuration 94 as shown at 96, 98, 100, and 102.

It should be noted that various modifications may be made to the example of FIG. 4. These modifications could include the omission of one or more of the depicted elements, rearrangement of the depicted components, as well as the inclusion of additional circuitry such as synchronization elements 110, buffer pointer controls 112, phase lock loops 108, clock generators 108, register configuration modules 104, CPU code ROM 106, etc. Storage in physical memory 72 of inputs and outputs may or may not be done by each of the depicted circuit elements or may not be done at all. Additionally, some or all portions of the calculations may be performed on block units that make up a portion of a video frame at a time due to the high pixel density of modern video. For example, a system performing picture rate conversion for a video having 1920× 1080 pixels may operate on individual blocks 64×32 pixels in size and then coordinate results of the block calculations in generating intermediate frames.

Figure 5:
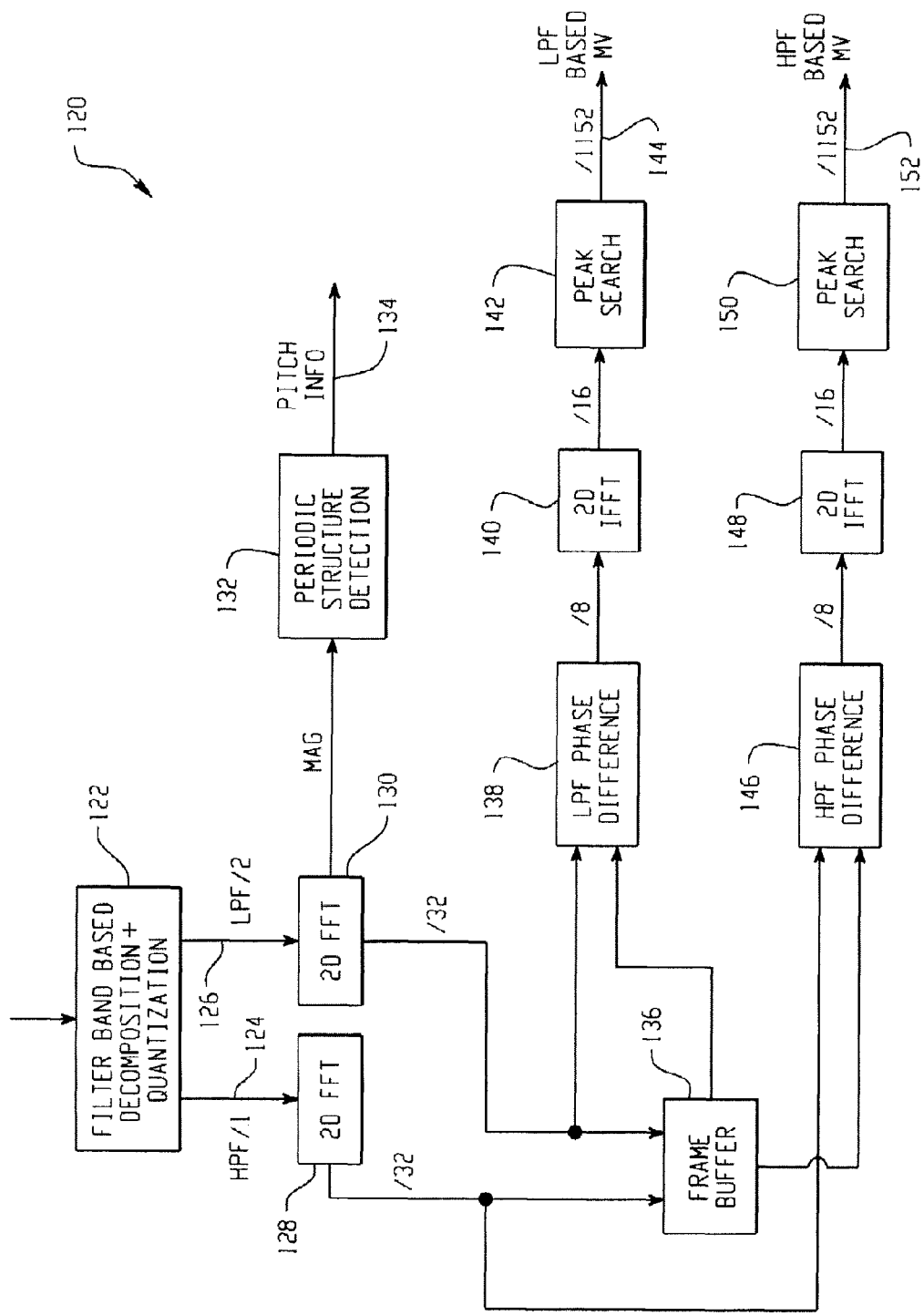
FIG. 5 is a flow diagram illustrating a phase plane correlation process for generating motion vectors.

FIG. 5 is a flow diagram illustrating a phase plane correlation calculator 120 for generating motion vectors. The phase plane correlation calculator 120 calculates the motion between two frames using the Fourier shift theorem. The Fourier shift theorem states that two signals shifted by a uniform translation are phase shifted when represented in the frequency-domain. Thus, by taking the Fourier transform of two images that are shifted by a given translation, the Fourier representation of the signal is shifted by a phase shift that is proportional to the translation. The inverse Fourier transform of the phase shift generates a phase correlation surface where the position of the peaks in the surface represents the magnitude of the shift, and the height of the peaks represents the reliability of the estimated motion vectors. The maximum translation that a phase plane correlation calculator 120 is capable of detecting is based on the size of the Fourier transform. An N point Horizontal by M point vertical Fourier transform can measure the maximum shift of +/−N/2 horizontal and +/−M/2 vertical. The typical motion range for a 1080p resolution signal may use a Fourier transform of 64×32 pixels or more.

When block sizes becomes large, the reliability of the estimated motion vectors may decrease. Thus, it is often possible to miss small object motion because small objects do not make large contributions to the correlation surface and are masked by noise in the image. To circumvent this problem, a filter bank based design may be utilized. Filtering the input signal into low pass representations and high pass representations aides the MCPRC system in identifying both large and small object motion within a video frame. Typical motion compensation converters are unable to account for such multiple object movement within a video frame. Thus, incorrect motion vectors may be calculated where multiple objects are moving at the same time, such as in a sports video where players may appear as large objects on the screen moving in one direction while a small ball may also be depicted moving in a different direction or at a different speed. By decomposing input signals into both low pass and high pass representations, both small and large object motion may be better accounted for and more optimal motion compensation may be accomplished. The low pass filtered image captures the global motion or large object motion in the block, and the high pass filtered image captures the small object motion. Because these two motion engines are independent of each other, the problem of failing to compensate for small object motion may be addressed.

The process for generating motion vectors of FIG. 5 begins with the receipt of previous frame data and current frame data for a block at a filter band based decomposition and quantization unit 122. In the filter band based decomposition and quantization unit 122, the effect of noise is minimized by quantization of the signal, and the previous frame data and current frame data are decomposed into high pass 124 and low pass 126 representations via a high pass filter and a low pass filter resulting in a low pass previous frame representation ($F_1(x_1,y_1)$), a low pass current frame representation ($F_2(x_2,y_2)$), a high pass previous frame representation ($F_3(x_3,y_3)$), and a high pass current frame representation ($F_4(x_4,y_4)$).

Following decomposition, each of the representations are processed by one or more two-dimensional fast Fourier transform calculators (FFTs) 128, 130. The two-dimensional FFTs 128, 130 take the time-domain representations output by the filter band based decomposition and quantization unit 122 and convert the representations into frequency-domain representations: $F_1(\omega_x, \omega_y)$, $F_2(\omega_x, \omega_y)$, $F_3(\omega_x, \omega_y)$, $F_4(\omega_x, \omega_y)$. Some or all of the frequency-domain representations may be temporarily stored in a frame buffer 136 before proceeding with further calculation. Maximum values at the beginning of a block may be retained and stored for later detection of periodic structures as shown at 132.

Following calculation of the frequency-domain conversions, a phase difference 138 is calculated between the low pass, frequency-domain representations of the previous frame data and the current frame data. For example, the phase difference may be calculated by solving for the "A" and "B" parameters of the following formula:

$$F_2(\omega_x, \omega_y) = e^{-j(A\omega_x + B\omega_y)} F_1(\omega_x, \omega_y).$$

After calculating the phase difference 138 between the previous frame data and the current frame data, a two-dimensional inverse fast Fourier transform (IFFT) 140 is applied to the calculated phase difference 138. The result of the IFFT 140 calculation is a two-dimensional phase plane correlation surface. The phase plane correlation surface may be viewed as a contour map identifying motion between the previous frame and the current frame of the source video. The locations of peaks on the phase plane correlation surface ($a_1$, $b_1$) correspond to motion within the frame block such that:

$$F_2(x_2,y_2) = F_1(x_2 + n \cdot a_1, y_2 + m \cdot b_1).$$

The height of a peak on the phase correlation surface corresponds to the size of an object that is moving within a block. To locate peaks within the phase correlation surface, a peak search 142 is performed, and based on the identified peaks, a low pass filter based motion vector 144 is determined. The low pass filter based motion vector 144 corresponds to large object motion within a frame block.

A similar process is performed utilizing the high pass frequency-domain representations ($F_3(\omega_x, \omega_y)$, $F_4(\omega_x, \omega_y)$) calculated by the two-dimensional FFT 128. Again, some or all of the high pass frequency-domain representations may be temporarily stored in a frame buffer 136. Following calculation of the high pass frequency-domain representations, a phase difference 146 is calculated between the high pass, frequency-domain representations of the previous frame data and the current frame data. For example, the phase difference 146 may be calculated by solving for the "C" and "D" parameters of the following formula:

$$F_4(\omega_x, \omega_y) = e^{-j(A\omega_x + B\omega_y)} F_3(\omega_x, \omega_y).$$

After calculating the phase difference 146 between the previous frame data and the current frame data, a two-dimensional IFFT 148 is applied to the calculated phase difference 146. The result of the IFFT calculation 148 may be viewed as a second two-dimensional phase plane correlation surface. The locations of peaks on the second phase plane correlation surface ($c_1, d_1$) correspond to motion within the frame block such that:

$$F_4(x_4, y_4) = F_3(x_4 + n \cdot c_1, y_4 + m \cdot d_1).$$

To locate peaks within the second phase correlation surface, a peak search 150 is performed, and based on the identified peaks, a high pass filter based motion vector 152 is determined. The high pass filter based motion vector 152 corresponds to small object motion within a frame block.

One of the difficulties in performing motion compensation on video having a high pixel density is the number of computations to be performed to accomplish high quality compensation. A video having 1920×1080 pixels is made up of about 1000 64×32 pixel blocks where each pixel block includes over 2000 pixels. Thus, an input picture rate of 60 Hz results in about 120 million calculations per second of video. To accommodate this large number of calculations, care may need to be taken regarding selection of components for the phase plane correlation calculator 42.

The choice of the filter bank involves appropriate selection of the low pass and high pass filter. It may be desirable to select filters according to the input signal. For example, for a block size of 64×32 pixels a multi-tap filter of 15×7 pixels may be selected. The filter size may also be selected to be proportional to the input resolution of the video. A higher resolution video has more redundancy of data and may require a larger filter kernel. Gradient edge based detectors such as the Sobel edge detector have been discovered to perform well as high pass filters. The gradient edge based detectors reliably detect the presence of small objects in blocks. To facilitate simplified, high-speed calculations by the FFTs 128, 130, the low pass and high pass data may be quantized to two bit and one bit resolution respectively.

As stated above, the FFTs 128, 130 may be required to perform very large numbers of computations very quickly. Examples of FFTs that may be used in the phase plane correlation calculator 42 include an FFT module that computes a 64 point FFT using a radix 2 decimation-in-time (DIT) implementation. The internal resolution of the FFT and hence the input and output resolutions are 2×16 bit wide (real and complex data). The FFT module is designed in a pipelined fashion and has a latency of around 10 clock cycles. Thus, if the input 64 data points are ready in clock 1, then the output 64 FFT values will be ready after 10 clock cycles latency. This design has a very high throughput. The inverse FFT may be done using the same block as is used for FFTs using a signal that controls the sign specific multipliers in the butterfly structure of the FFT module. A 32 point FFT may also be done using this FFT module by alternate zero insertion of the input data and then taking only the first 32 points of the output. The minimum time taken to compute the horizontal FFTs (HFFT) in this design of a 64×32 block is 32+10 clock cycles and for vertical FFTs (VFFT) is 64+10 clocks. The phase difference calculators 138, 146 may be implemented by modules using a CORDIC implementation to calculate the phase and magnitude of a complex number.

Following an IFFT calculation, the phase plane correlation surface has peaks that correspond to motion in the block. The phase plane correlation calculation process may result in multiple peaks in the correlation surface. An example search process 142, 150 finds the top four values of peaks in the correlation surface. Due to the presence of sub-pixel motion it is possible to have peaks whose values are shared between two adjacent locations. Thus, the search process may calculate a unique peak value in a neighborhood of 8 positions. In other words if a peak is found in position (x,y), then nearby peaks in positions (x+/−1,y+/−1) may not be considered. The location and magnitude of the discovered peaks are then utilized to calculate low pass and high pass based motion vectors 144, 152.

Figure 6:
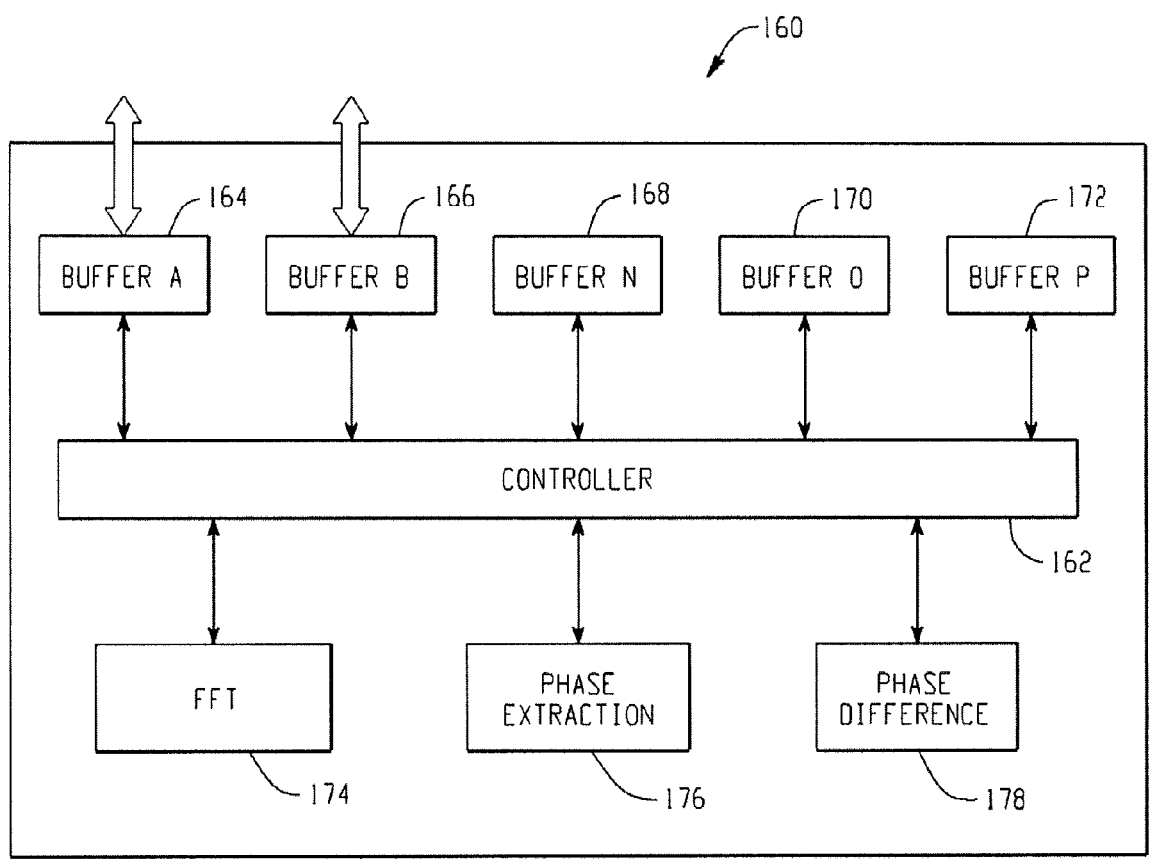
FIG. 6 is a block diagram illustrating a phase plane correlation calculator configuration.

FIG. 6 is a block diagram illustrating components of an example phase plane correlation calculator 160 for generating motion vectors. The implementation of FIG. 6 includes five buffers 164, 166, 168, 170, 172, a controller 162, and three data processing blocks 174, 176, and 178. Buffer A 164 and buffer B 166 are responsive physical memory. The input data to the phase plane correlation calculator 160 is the low pass and high pass filtered data from the current and previous frames which are referred to in the descriptions of FIGS. 6-8 as CLP (current frame low pass data), CHP (current frame high pass data), PLP (previous frame low pass data), and PHP (previous frame high pass data). The FFT module 174 may be multiplexed to perform both HFFT and VFFT operations as well as inverse FFT operations. The controller 162 is responsible for timing the data flow inside the phase plane correlation calculator 160. The configuration 160 of FIG. 6 is able to take advantage of the conjugate symmetry of FFTs of real input data resulting in a potential memory savings if downstream calculation compensations are made.

Figure 7:
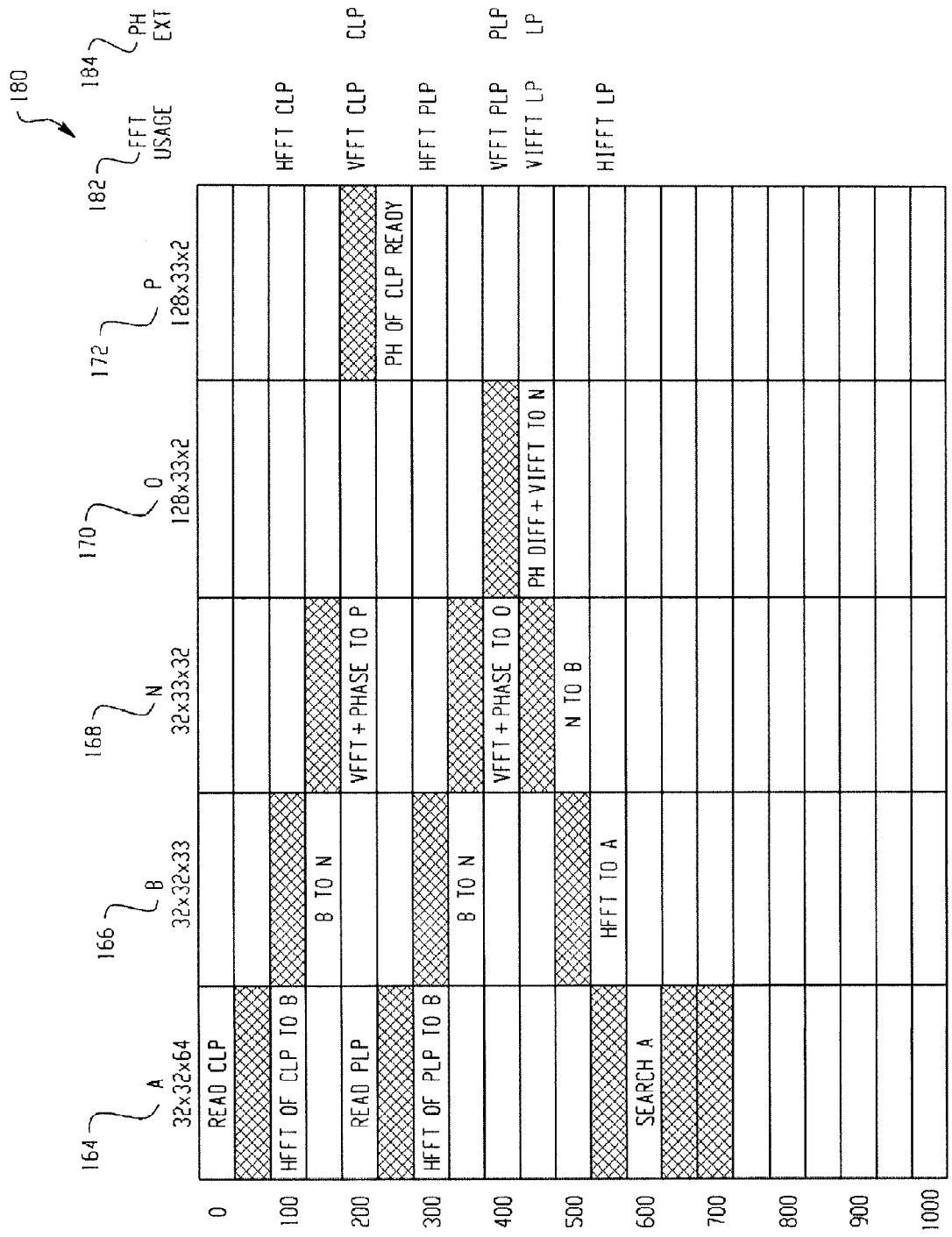
FIG. 7 is a timing chart illustrating buffer usage and timing of a phase plane correlation calculation operation.

FIG. 7 is a timing chart depicting the timing of calculations and buffer usage during an example operation of the phase plane correlation calculator of FIG. 6. In the example of FIG. 7, the vertical axis displays time in units of clock cycles, and the horizontal axis represents individual buffers that correspond to buffer A 164, buffer B 166, buffer N 168, buffer O 170, and buffer P 172 of FIG. 6. The FFT Usage column 182 identifies what type of operation the FFT module 174 is performing. Similarly, the Phase Extraction column 184 identifies any phase extraction operations 176 being performed at a particular time. In the example of FIG. 7, a latency of 100 clock cycles is associated with reading a 64×32 block of data from physical memory. HFFTs take 50 clock cycles, VFFTs plus phase extractions take 50 clock cycles if 32 phase extractors work in parallel, vertical inverse fast Fourier transforms (VIFFTs) plus phase difference calculations take 50 clock cycles if 32 phase differences work in parallel, horizontal inverse fast Fourier transforms (HIFFTs) take 50 clock cycles, data copies between buffers take 50 clock cycles, and search operations can be accomplished in 150 clock cycles utilizing 16 search engines operating in parallel where each row can be searched in 64 clock cycles (128 clock cycles plus latency). In the example of FIG. 7, input data resolution is two bits for the low pass data and one bit for the high pass data, the output of any FFT is 32 bits (16 bits to represent the real component, 16 bits to represent the complex component), and phase values are 8 bits.

The phase plane correlation calculator 160 of FIG. 6 begins after 32 lines of the current frame have been written into physical memory. Once 32 lines of the current frame have been written into physical memory, the following steps are performed as depicted in FIG. 7. At clock cycle 0, the block of CLP (64×32 samples) data is read from physical memory and stored in buffer A 164. This step takes 100 clock cycles. At clock cycle 100, an HFFT of the rows of data in buffer A 164 is performed with the results being simultaneously stored in buffer B 166. This is done in 50 clock cycles. The data from buffer B 166 (a row wise databank) is copied to buffer N 168 (a column wise databank) in 50 clocks at clock cycle 150 performing a transpose operation. This is to facilitate a column wise data read for the VFFT. At clock cycle 200, a VFFT is performed on the data in buffer N 168 and a phase extraction 176 of the 33 columns in buffer N 168 is performed with the phase value results being simultaneously stored in buffer P 172. This step takes 50 clock cycles.

Simultaneously at clock cycle 200, a block of PLP data can be read from physical memory to buffer A 164. In similar fashion as the CLP data, an HFFT of the PLP data is performed at clock cycle 300 with the results being stored in buffer B 166. A transpose operation is performed at clock cycle 350 transferring the PLP data from buffer B 166 to buffer N 168. A VFFT is performed on the data in buffer N 168 at clock cycle 400 with the results being stored in buffer O 170.

Following phase extraction for the PLP data, the phase differences of the data in buffer P 172 and buffer O 170 are calculated column wise and then an inverse VFFT is performed with the results being stored in buffer N 168 as illustrated at clock cycle 450. Data from buffer N 168 is then copied to buffer B 166 at clock cycle 500 to facilitate row wise processing. This takes 50 clock cycles. An HIFFT operation is performed on the data in buffer B 166 with the results stored in buffer A 164 at clock cycle 550. This takes 50 clock cycles. Due to the conjugate symmetry memory savings procedures discussed above, only 33 samples of the row are available in buffer B 166. The remaining samples are generated by taking the complex conjugate of the existing columns and the full 64 samples are sent for HIFFT. The 64×32 output samples of the HIFFT represent the phase plane correlation surface that are then searched over the next 150 clock cycles beginning at clock cycle 600 to find the top 4 values corresponding to potential peak values of the phase plane correlation surface. Candidate motion vectors are then determined based upon the identified peaks, and the above described steps are repeated for the high pass data.

Figure 8:
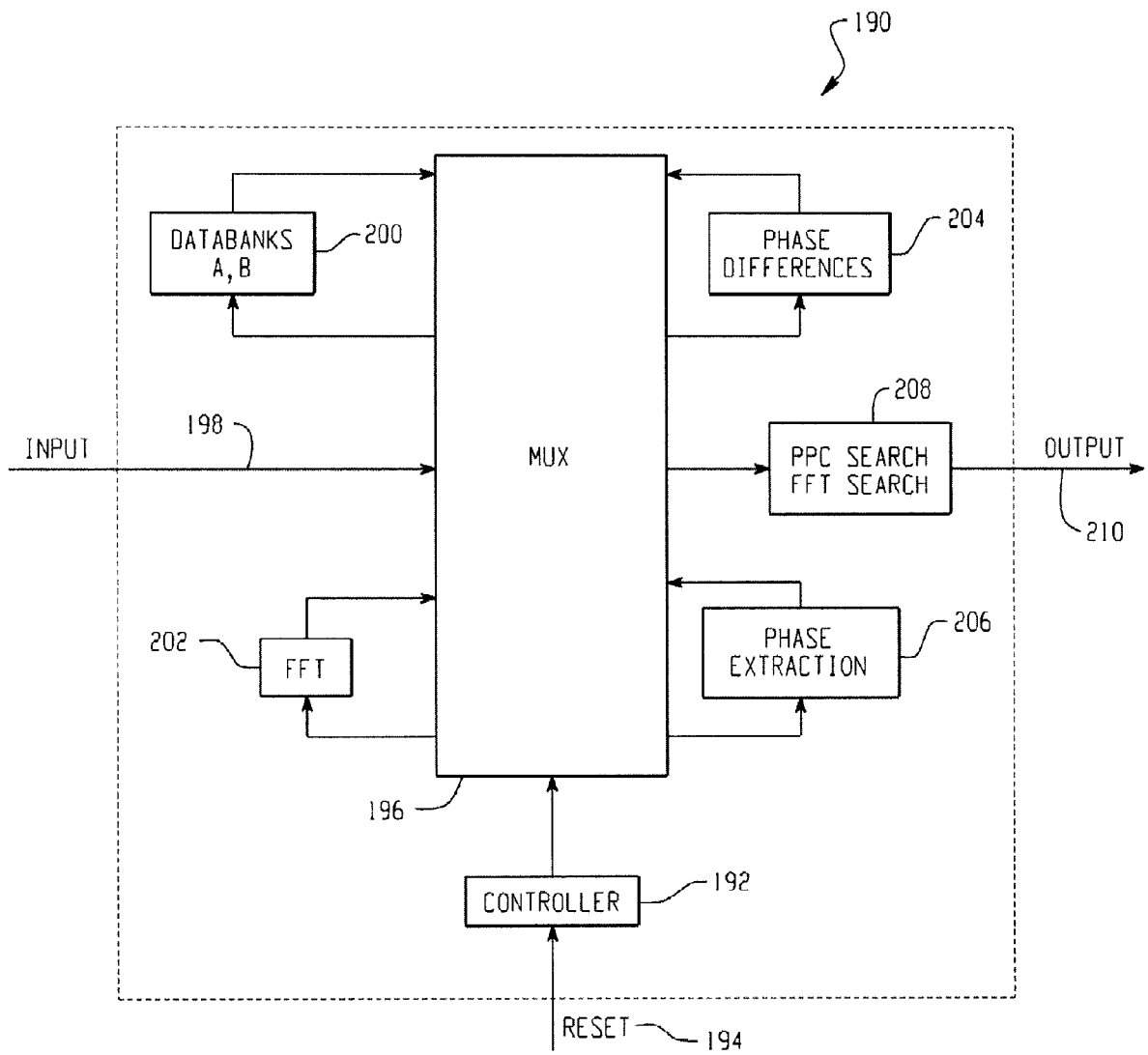
FIG. 8 is a block diagram illustrating another phase plane correlation calculator configuration.

FIG. 8 is a block diagram illustrating another example phase plane correlation calculator configuration 190 for generating one or more motion vectors. The configuration of FIG. 8 includes a multiplexer module 196 that is responsive to two databanks A and B 200, a controller 192, a search module 208, an FFT calculator 202, a phase extraction module 206, and a phase difference calculator 204. The phase plane correlation calculator receives the CLP, CHP, PLP, and PHP data as inputs 198.

The controller 192 of FIG. 8 performs several functions. The controller 192 generates read signals to physical memory that initiate data transfer to the phase plane correlation calculator 190. The controller 192 also generates selection logic for the multiplexer 196. The controller 192 further generates the address and write enable signals for each memory, (e.g., sRAM) in databanks A and B 200. The controller 192 may run according to a synchronous counter that is reset by a frame reset signal 194. The phase plane correlation calculator 190 may run on the system clock where all signals generated by the controller 192 are dependent on the state of the counter.

The inputs and outputs of the data processing modules 202, 204, 206 are connected to the multiplexer module 196. Depending upon the operation being performed, individual multiplexers inside the multiplexer module 196 are connected using selection logic from the controller 192. The FFT module 202 is multiplexed to perform HFFT and VFFT operations. Because the phase plane correlation calculator inputs are always real (no imaginary component), the columns of the block after performing an HFFT operation exhibit conjugate symmetry. Because this symmetry is known based on the real inputs, a memory savings can be realized because after a VFFT operation, the columns from 64/2+1 onwards are circularly shifted versions of columns 1 to 64/2. Due to this known data redundancy, storage for nearly half the columns may be eliminated as long as compensations are made downstream based on this data paring. For example databank A 200 may contain 33 sRAMs, 32 bits wide by 34 locations deep, sized to be able to handle the maximum storage and access requirements. Databank B 200 only stores phase values and can, therefore, be much smaller in size than databank A 200.

In the example of FIG. 8, after 32 lines of current frame data have been written to physical memory, the phase plane correlation calculation processing can begin. The first 32 lines of data in physical memory are processed during the time taken for the next set of 32 lines to arrive. Thus, the data processing on a single 64×32 pixel block needs to be finished in 2048 clock cycles if one pixel is written to physical memory per clock cycle. If the number of processing cycles is less than 2048, then the phase plane correlation calculator 190 may operate on a slower clock.

In operation, the phase plane correlation calculator 190 of FIG. 8 reads a block of CLP (64×32 samples) data from physical memory, passes the CLP data through the FFT module 202 for HFFT, and stores the first 33 columns in databank A 200. The CLP HFFT data in databank A 200 is transposed to enable column reading. A VFFT is then performed on the data in databank A 200 followed by a phase extraction 206 with the resulting phases being stored in databank B 200. While reading the data from the FFT, the FFT search 208 (for discovering periodic structures) is done for the CLP data.

PLP data is read from physical memory, passed through the FFT 202 for HFFT, and stored in databank A 200. The PLP HFFT data is transposed in A as was done with the CLP HFFT data previously. A VFFT operation is performed on the data in databank A 200 followed by phase extraction 206 with the resulting phases being stored in databank A 200. The phase differences 204 of the data in databanks A and B 200 are calculated column wise, and the results of an inverse VFFT operation 202 on the phase differences are stored in databank A 200.

The data in databank A 200 is transposed to enable row processing, and an inverse HFFT is performed on the data in databank A 200 using the FFT module 202 with the results being stored in databank A 200. While performing the HIFFT, only 33 samples of the row are available in B due to the storage savings made possible based on the conjugate symmetry of the FFT of real input values as described above. The remaining samples are generated by taking the complex conjugate of the existing columns, and the full 64 samples are sent to HIFFT. A PPC search is done on the data in databank A 200 to find peak values in the phase plane correlation surface, and corresponding output motion vectors are determined and output as illustrated at 210. These steps are then repeated for high pass data.

Figure 9:
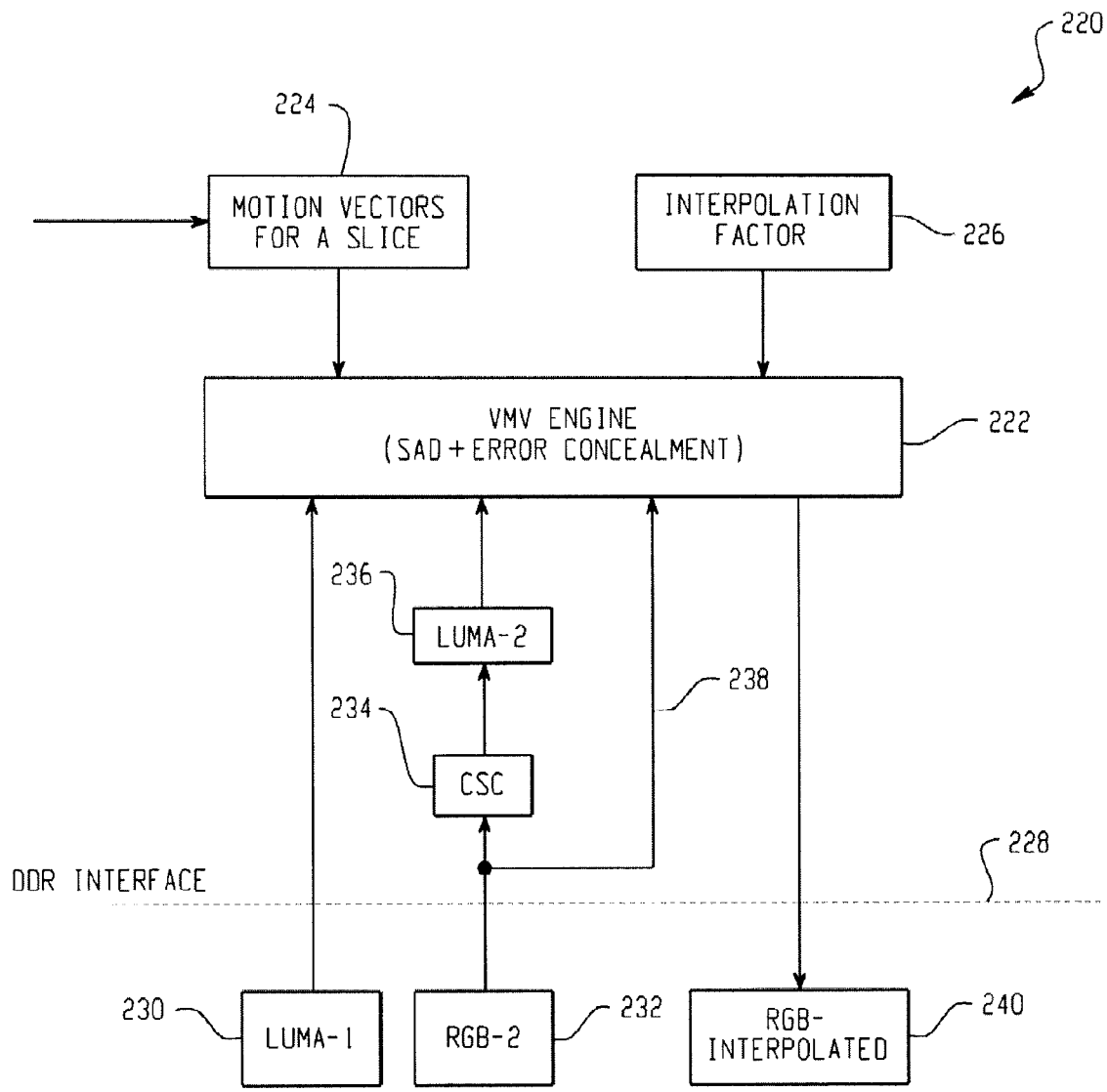
FIG. 9 is a block diagram illustrating inputs to a vector motion validation engine.

FIG. 9 is a block diagram 220 illustrating inputs to a vector motion validation (VMV) engine 222. The VMV engine 222 of FIG. 9 selects a final motion vector describing object motion within a block from a set of candidate motion vectors, generates one or more intermediate frames, and performs error concealment techniques on the generated intermediate frames.

One method of selecting a final motion vector is by making a quality calculation for each of the candidate motion vectors and selecting the candidate motion vector that yields the best score. Candidate motion vectors may come from estimation calculations such as the phase plane correlation calculation described above, motion vectors from neighboring blocks, from other motion vector estimations such as the global motion calculations described below, as well as a variety of other sources. The quality calculation may include a variety of matching techniques including sum of absolute differences (SAD) and sum of squared differences (SSD). The quality calculation may also include other terms such as a smoothness term. For example, the following quality calculation formula may be utilized where the vector resulting in the lowest cost is selected as the final motion vector:

$$\text{Cost}(x,y,t) = \alpha f(\text{Data}) + \beta f(\text{smoothness})$$

The first function corresponds to a distortion measure such as SAD or SSD. If SAD is selected, the first function could be represented as:

$$f(\text{Data}) = \Sigma |I_1(x,y,t_1) - I_2(x-dx_i, y-dy_i, t_2)|,$$

where and $I_2$ are the current and previous frames, respectively, and $dx_i$ and $dy_i$ represent a candidate motion vector.

As noted above, picture rate up-conversion may be performed from a variety of source video rates to a variety of target data rates. The factor of the source to target data rates dictates the number of intermediate frames that are interpolated into the target video. For example, an up-conversion from a 60 Hz source video to a 120 Hz target video results in the insertion of 1 frame between frames of the source video in the target video. Thus, one frame is inserted halfway between source video frames resulting in an interpolation factor of 0.5: 60 Hz/120 Hz=0.5. For conversion from a 24 Hz source video to 120 Hz target video, four frames are inserted between source frames in the target video. Inserting four frames between source video frames causes an intermediate frame to be inserted every 0.2 source frames resulting in interpolation factors of 0.2, 0.4, 0.6, and 0.8: 24 Hz/120 Hz=0.2.

The interpolation factor is utilized in generating intermediate frames. A final motion vector selected by the VMV engine 222 corresponds to the detected motion between the previous frame and the target frame. However, in the example of 60 Hz to 120 Hz conversion, the intermediate frame will depict object motion halfway between the previous frame and the target frame. Thus, when calculating the proper motion of objects within a block in an intermediate frame, the final motion vector is multiplied by the interpolation factor, 0.5, to capture object position at the time of interest (i.e., the time of the intermediate frame). Similarly with 24 Hz to 120 Hz conversion, the first intermediate frame utilizes the final motion vector multiplied by the first interpolation factor, 0.2, the second intermediate frame utilizes the final motion vector multiplied by the second interpolation factor, 0.4, the third intermediate frame utilizes the final motion vector multiplied by the third interpolation factor, 0.6, and the fourth intermediate frame utilizes the final motion vector multiplied by the fourth interpolation factor, 0.8.

FIG. 9 illustrates example inputs to the VMV engine 222. As described above, the VMV engine 222 receives one or more candidate motion vectors 224. The VMV engine 222 may be configured to operate on different subsets of the entire picture data. For example, the VMV engine 222 may operate on single blocks at a time, a collection of blocks, or the entire picture. In the example of FIG. 9, the VMV engine 222 operates on a single slice, which in a 1920×1080 pixel environment having 64×32 pixel blocks would be made up of a row of 30 64×32 pixel blocks. The VMV engine 222 receives the candidate motion vectors for a frame slice as well as interpolation factors 226. The VMV engine 222 also receives previous frame data 230 in luminance form and current frame data 232 in both luminance form 236 after a color space conversion 234 and in RGB form 238. The VMV engine 222 may also receive the previous frame data in RGB form (not shown). The VMV engine 222 outputs the RGB form interpolated intermediate frames 240.

In operation, the example of FIG. 9 begins with an interrupt from the timing controller to the CPU requesting candidate motion vectors 224 for a slice. The CPU responds by supplying the motion vectors 224 for the slice to the VMV engine 222. The number of motion vectors per block in this example is 14. However, any number of motion vectors may be provided to the VMV engine 222 provided sufficient computation time is available. The appropriate interpolation factor or factors 226 are also provided to the VMV engine 222 at the direction of the CPU. The SAD is calculated based on the vectors supplied to the VMV 222, the received previous frame data 230 and current frame data 236, 238, and the temporal and spatial smoothness constraint built into the cost function. The best motion vector is selected as the final motion vector, which is then used to generate the interpolated frame.

Figure 10:
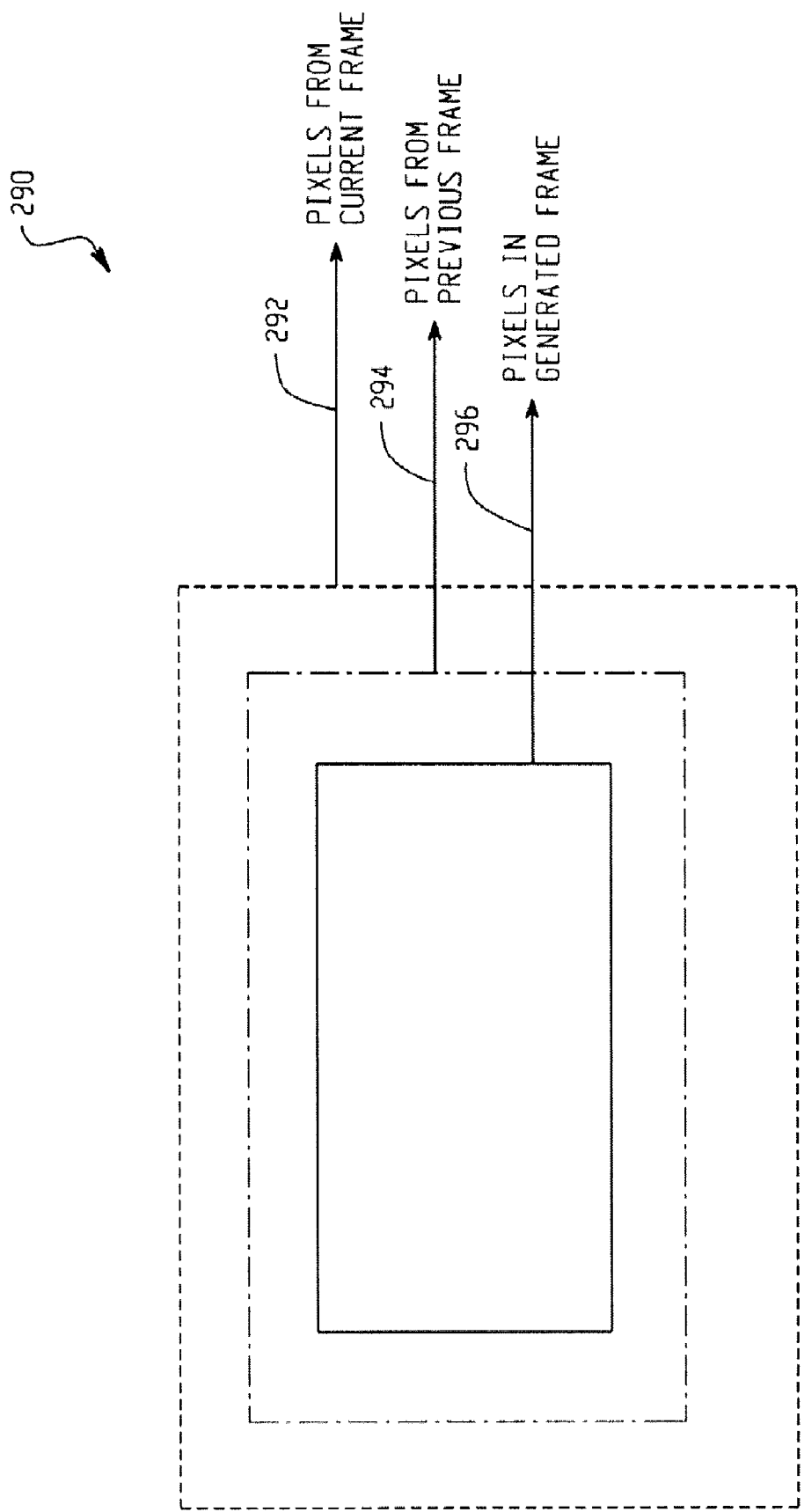
FIG. 10 is an illustration of a block structure for the reference and interpolated frames.

FIG. 10 is an illustration of a block structure for the reference and interpolated frames. The VMV engine 222 generates interpolated frames block by block (e.g., one 64×32 pixel block at a time). To generate an interpolated window, the VMV engine 222 utilizes pixel information from both the previous 230 and current 236, 238 frames. As shown in FIG. 10, the pixels in the generated window lie in spatially aligned locations in the previous and current frames. Based on the maximum magnitude of motion vectors, the maximum motion supported may be limited. For example, the maximum motion supported may be ±32 pixels in the x direction and ±16 pixels in the y direction. Thus, where "i" is the interpolation factor, a pixel in the generated frame would be found at a distance of at most (32i, 16i) pixels in the previous frame and at a distance of at most (32(1−i), 16(1−i)) pixels in the current frame.

For 5× interpolation (e.g., 24 Hz to 120 Hz), as "i" increases from 0.2 to 0.8, the boundary that defines the set of pixels used for SAD calculation increases in the previous frame and decreases in the current frame. This fact may be used to optimize bandwidth for memory transfers. The VMV engine 222 may use the RGB representation from the frame that has a smaller boundary and the luminance representation from the other frame. Thus, for interpolation factors 0.2 and 0.4, the RGB pixel from the previous frame and the luminance pixel from the current frame are used for SAD calculations. For interpolation factors 0.6 and 0.8, RGB pixels from the current frame and luminance pixels from the previous frames are utilized. The worst case bandwidth required occurs at an interpolation factor of 0.5.

Figure 11:
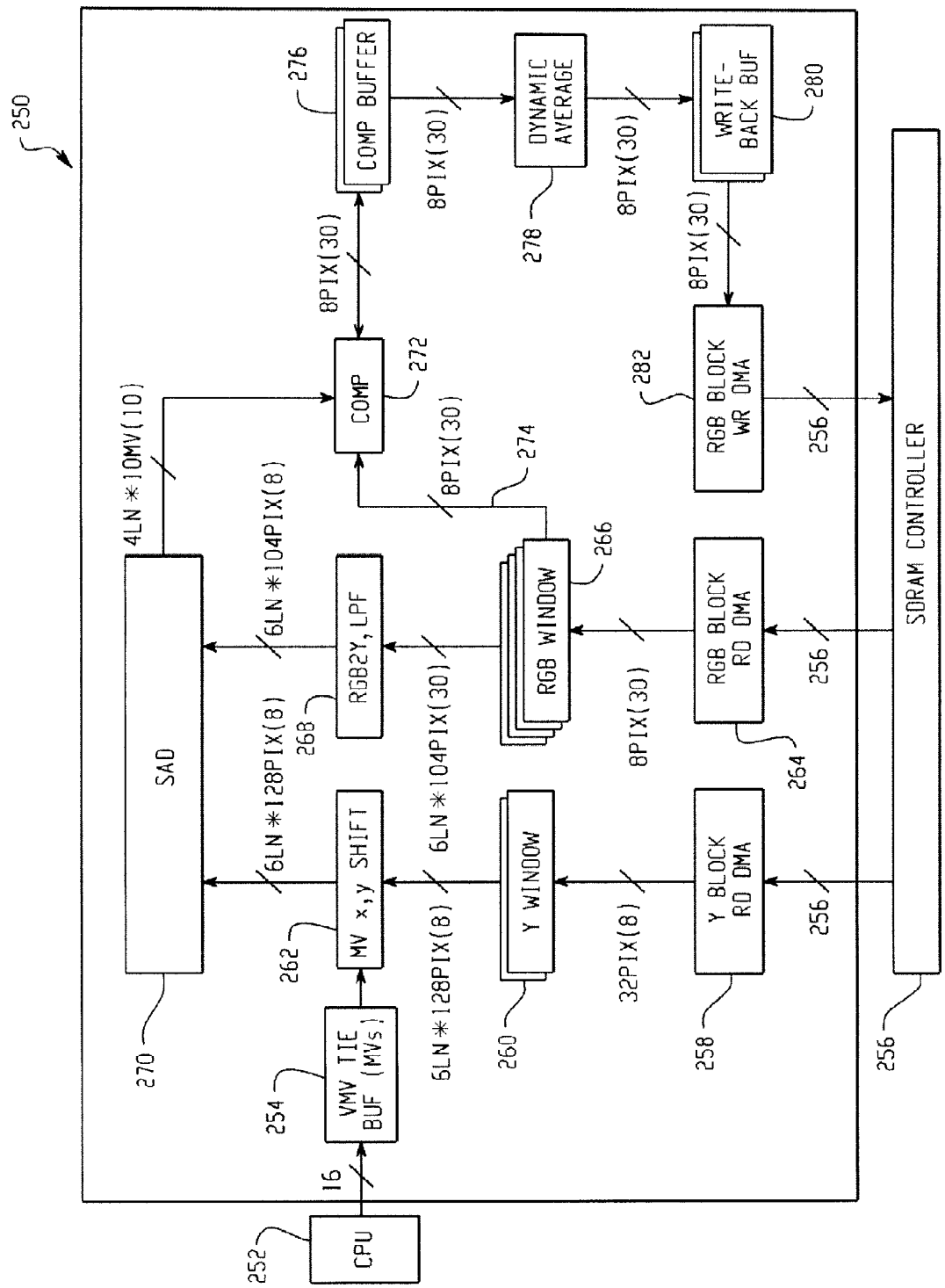
FIG. 11 is a block diagram illustrating components of an example motion vector validation engine.

FIG. 11 is a block diagram illustrating components of an example motion vector validation engine 250. In the configuration of FIG. 11, a central processing unit 252 provides candidate motion vectors to a VMV buffer 254. The VMV buffer 254 may be implemented as a circular buffer such that as one candidate motion vector is processed, a new motion vector is input to the buffer 254. In the example of FIG. 11, the VMV buffer 254 accommodates candidate motion vectors for 2 slices (up to 2×30 windows) so that the VMV engine 250 may work on one slice while the next slice is being written by the CPU 252. Using 18 bit motion vectors, the VMV buffer 254 of this example is 17,280 bits in size.

The VMV buffer 254 provides motion vectors to a shift register 262. The shift register 262 receives data associated with the previous frame window through a double buffer 260. The previous frame window of FIG. 11 is sized 96×62 pixels centered on the current 64×32 block to accommodate the maximum motion vector excursions of (±32, ±16) pixels. The luminance read block DMA 258 reads previous frame data from memory via the SDRAM controller 256. The double buffer configuration 260 enables the shifting 262 and SAD processing 270 to be done at the same time as DMA operation 258 for subsequent frame processing. The shift register 262 applies the current candidate motion vector from the motion vector buffer 254 to the previous frame data from the luminance window 260 to generate a shifted candidate window that is provided to the SAD calculator 270.

The SAD calculator 270 also receives current frame data via the current frame read path 264, 266, 268. The RGB block read DMA 264 accesses current frame data via the SDRAM controller 256 and provides the current frame data to the RGB window block 266. The RGB window block 266 is multiple buffered similar to the luminance window 260 to facilitate parallel processing. In the example of FIG. 11, the RGB window buffer 266 contains a window from the current frame with a size of 104×54 pixels to accommodate motion vector excursions. The buffer 266 is implemented as a multi-buffer so that SAD 270 and DMA 264 operations may occur simultaneously. The RGB block read DMA 264 is a high bandwidth sdram client that operates on a 256×54 pixel block for best efficiency. This requires that the RGB buffer 266 be capable of storing a total of 552×54 pixels. At any point of time, VMV operations occur on a 104×54 pixel section of this buffer. Data from the RGB buffer 266 may be passed through a low pass filter 268 prior to being provided to the SAD calculator 270.

The SAD calculator 270 receives the shifted candidate window from the shift register 262 and current frame data from the current frame read path 264, 266, 268. The SAD calculator 270 performs a quality calculation on the shifted candidate frame and the current frame data by comparing the two inputs. If the candidate motion vector associated with the shifted candidate frame is accurate, the two inputs will be similar resulting in a low SAD score. If the candidate motion vector is poor, the two inputs will be very different resulting in a high SAD score. The SAD calculator 270 selects the candidate motion vector associated with the best quality calculation score as the final motion vector for a pixel.

Following selection of a final motion vector, one or more intermediate frames are generated in the compensator block 272 and stored in the compensation buffer 276, which may be implemented as a double buffer. The dynamic average block 278 receives the generated intermediate frames and applies error correction and concealment procedures. The dynamic average block 278 outputs the intermediate frames to a writeback buffer 280 where the frames await being written to memory via the RGB block write DMA 282.

Figure 12:
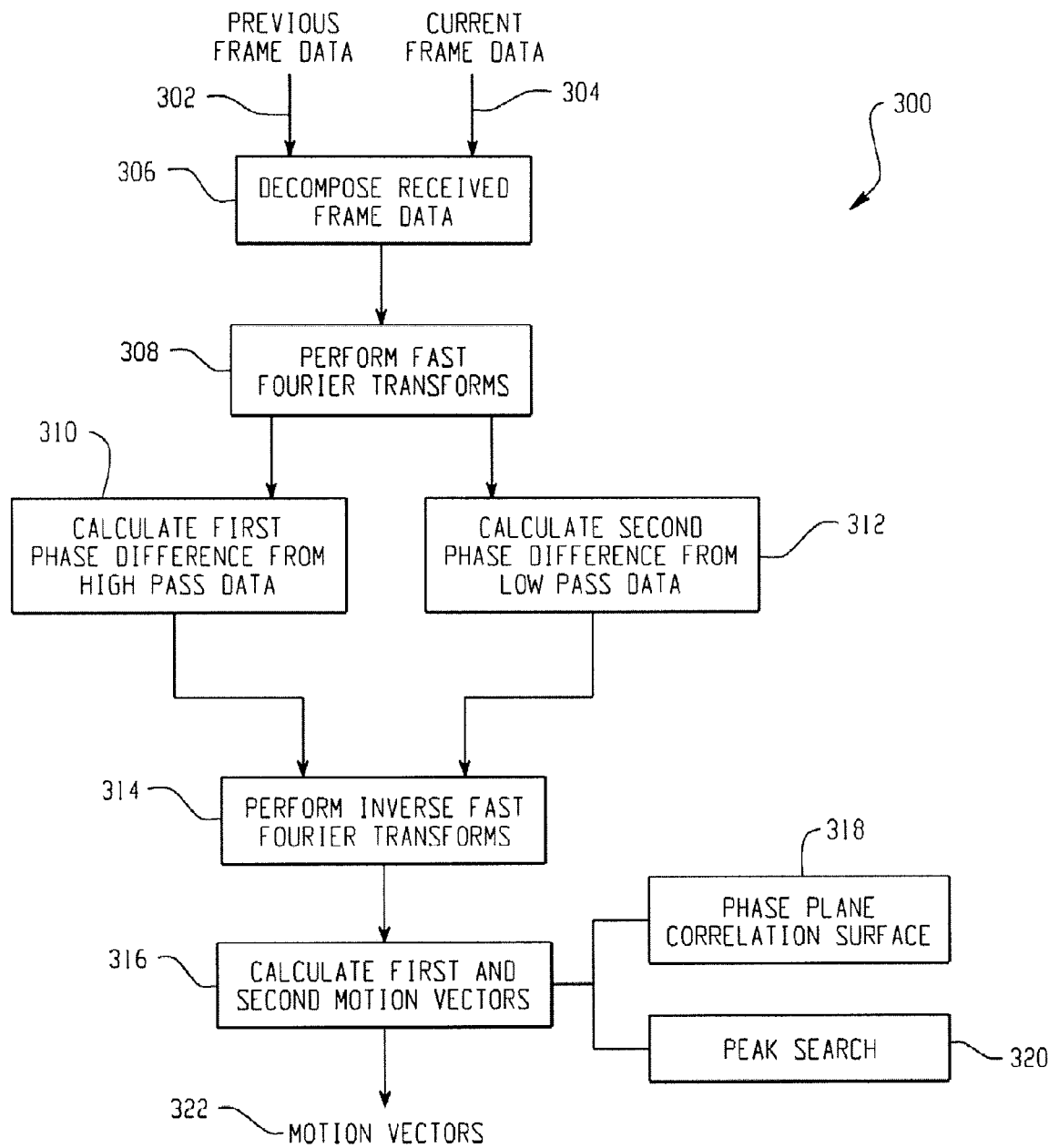
FIG. 12 is a flow diagram illustrating a process for calculating motion vectors from previous frame data and current frame data inputs.

FIG. 12 is a flow diagram illustrating a process 300 for calculating motion vectors from previous frame data 302 and current frame data 304 inputs. At step 306, the received previous frame data 302 and current frame data 304 are decomposed into high pass and low pass components. Fast Fourier transforms are then performed on each of the decomposed components in step 308. Phase differences between the high pass components and between the low pass components are then calculated in steps 310 and 312, respectively. Following phase difference calculations 310, 312, inverse fast Fourier transforms are performed on the calculated phase differences in step 314. The inverse Fourier transform output is data that may be viewed as a phase plane correlation surface 318. The output of the inverse fast Fourier transforms are utilized to calculate candidate motion vectors in step 316. By identifying peaks on the phase plane correlation surface 318 via a peak search 320, motion between the previous frame and the current frame can be detected. Based on the location of these peaks, output motion vectors 322 are calculated at 316.

The steps of FIG. 12 may be executed in a variety of orders with varied steps including additional steps or the omission of certain steps. For example, steps 310 and 312 may be executed in parallel, or in series, or may be computed at disparate times with other steps executed in between. Further, steps 314 and 316 may be executed for the high pass components followed by execution of steps 314 and 316 for the low pass components, or vice versa. Steps 314 and 316 could also be executed in parallel for the low pass and high pass components as well.

Figure 13:
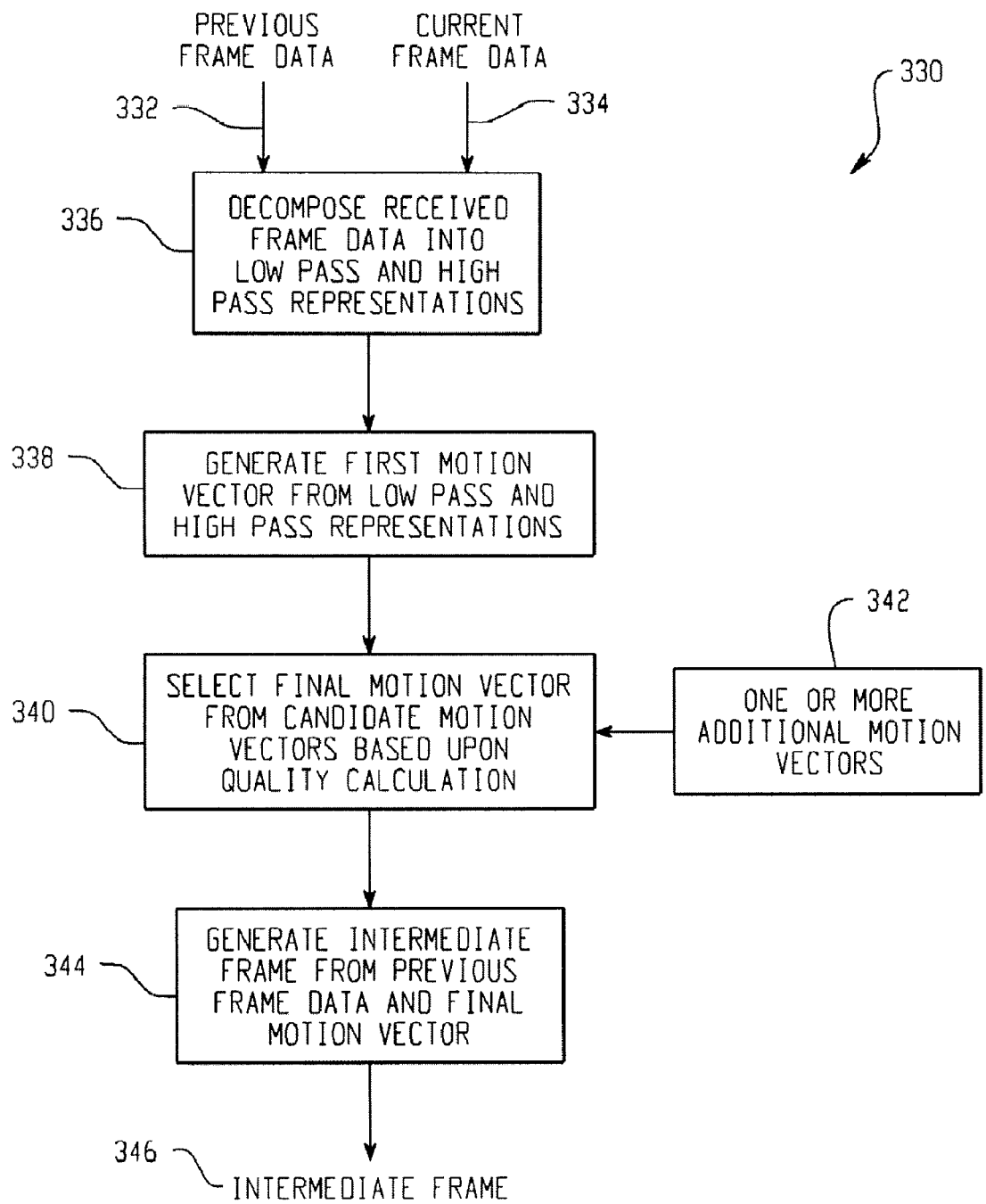
FIG. 13 is a flow diagram illustrating a process for generating an intermediate frame from previous frame data, current frame data, and additional motion vector inputs.

FIG. 13 is a flow diagram illustrating a process 330 for generating an intermediate frame from previous frame data 332, current frame data 334, and additional motion vector inputs 342. At step 336, the received previous frame data 332 and current frame data 334 are decomposed into high pass and low pass representations. These decomposed representations are utilized to calculate a first motion vector estimate in step 338. In step 340, a final motion vector is selected from the first motion vector as well as one or more additional candidate vectors 342 based upon a quality calculation. Utilizing the selected final motion vector, an output intermediate frame 346 is generated based on the previous frame data 332 in step 344.

Figure 14:
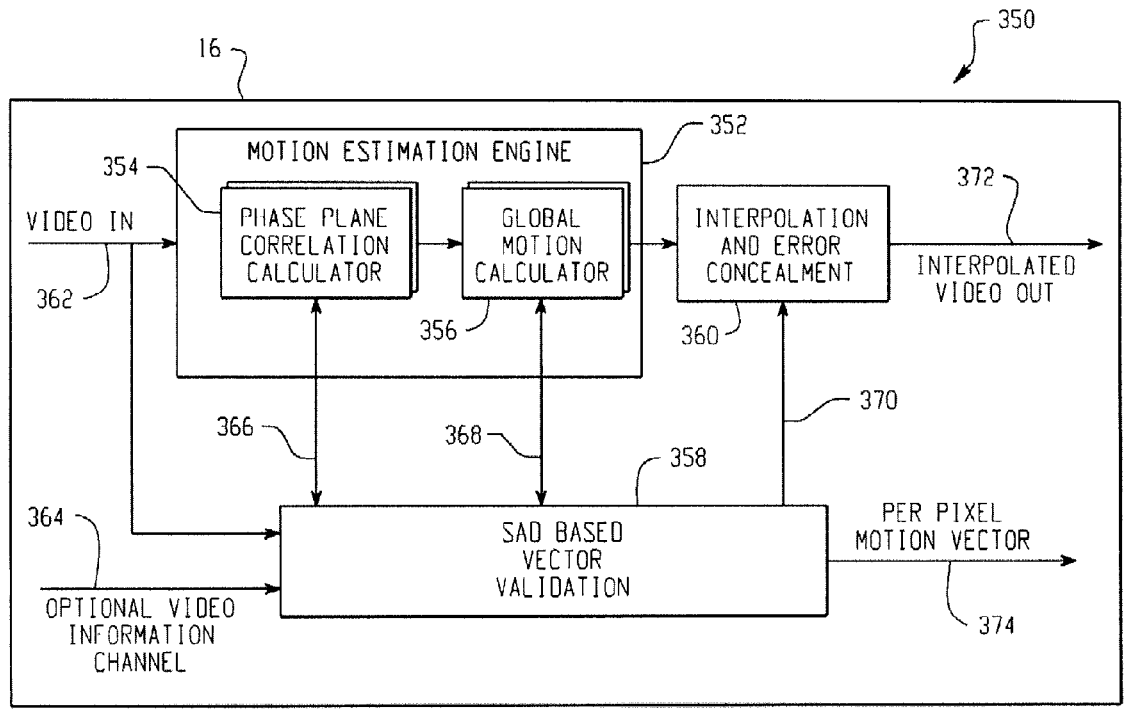
FIG. 14 is a block diagram illustrating a motion compensated picture rate converter including a phase plane correlation calculator and a global motion calculator.

FIG. 14 is a block diagram illustrating a motion compensated picture rate conversion module 350 including a phase plane correlation calculator 354 and a global motion calculator 356 that may be integrated as module 16 in the configurations of FIGS. 1 and 2, respectively, for providing object motion estimation between pairs of consecutive frames in an input video signal 362.

In FIG. 14, an input video signal 362 is processed by a motion estimation engine 352 that includes the phase plane correlation calculator 354 and the global motion calculator 356. The phase plane correlation calculator 354 determines a motion vector estimate that is provided to the SAD based vector validation module 358, as shown at 366. The motion vector estimate from the phase plane correlation calculator 354 is also provided to the global motion calculator 356 to be used as an initial guess in calculating a second motion vector estimate that is provided to the SAD based vector validation module 358, as shown at 368. The SAD based vector validation module 358 also may receive a copy of the video input signal 362 and a video information channel 364. The SAD based vector validation module 358 determines a per pixel motion vector 374, 370 based upon the motion vector estimates 366, 368 from the phase plane correlation calculator 354 and global motion calculator 356, respectively, and may consider other motion vector inputs (not shown) in that determination. The per pixel motion vectors are received by an interpolation and error concealment module 360, as shown at 370, where intermediate frames are generated for insertion into a target video.

In estimating global motion, the most dominant motion in video is translation. In an affine motion representation, the affine parameters that represent the zoom and rotation are small in magnitude and may be estimated using a sparse motion field. Large translation estimation is more difficult in comparison. Phase correlation based estimation, as described above, measures sub-pixel motion with limited complexity. Using the predicted values from the phase correlation values as an initial guess assuming no rotation or scaling in the image, the subsequent RANSAC (RANdom SAmple Consensus) based estimation stage refines the motion parameters.

The affine model is chosen for simplicity. However, the global motion calculation may be extended to any other motion model such as projective, etc. The affine motion model may be expressed as:

$$X' = A*X + B,$$

where $X=[x,y]^T$ represents a position of a selected pixel group in the previous frame, $X'=[x',y']^T$ represents a position of a selected pixel group in the current frame, where $$A = \begin{bmatrix} a_{11} & a_{12} \\ a_{21} & a_{22} \end{bmatrix}$$

represents motion parameters corresponding to zoom and rotation of the selected pixel group from the previous frame to the current frame, and $$B = [b_x, b_y]^T$$

represents motion parameters corresponding to pan motion of the pixel group from the previous frame to the current frame.

Figure 15:
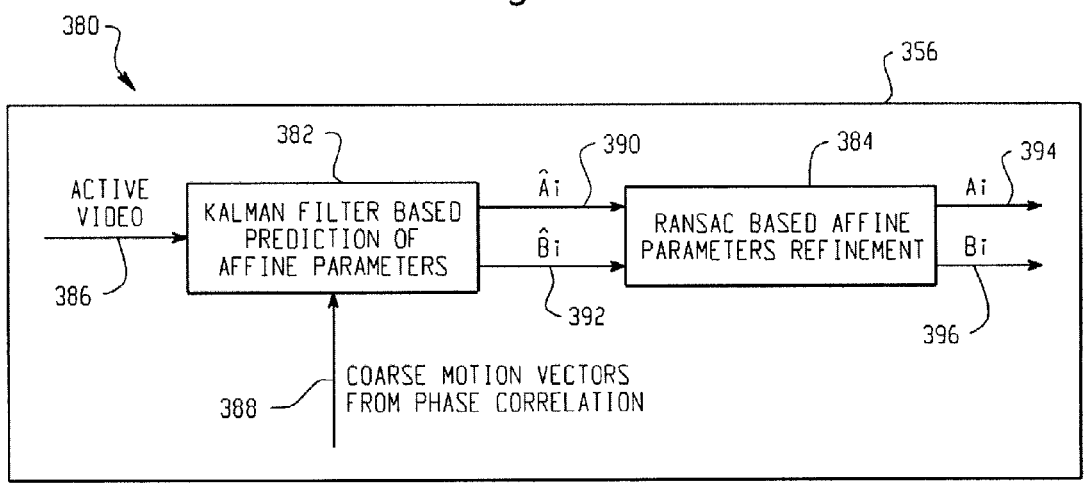
FIG. 15 is a flow diagram illustrating the calculation of affine parameters in a global motion calculator.

FIG. 15 is a flow diagram illustrating the calculation of affine parameters in a global motion calculator 380 that may be integrated as module 356 in the configuration of FIG. 14. The global motion calculator 380 illustrates the two step process for generating a motion vector estimate. The first step of the global motion calculation process 382 produces a Kalman filter based prediction of the affine parameters by receiving previous frame data and current frame data through a video input 386 and coarse motion vectors from the phase plane correlation calculator, as shown at 388, to produce an initial guess 390, 392 at the affine parameters. The second step 384 refines the initial guess 390, 392 through a procedure such as a RANSAC based affine refinement to produce refined affine parameters 394, 396.

Figure 16:
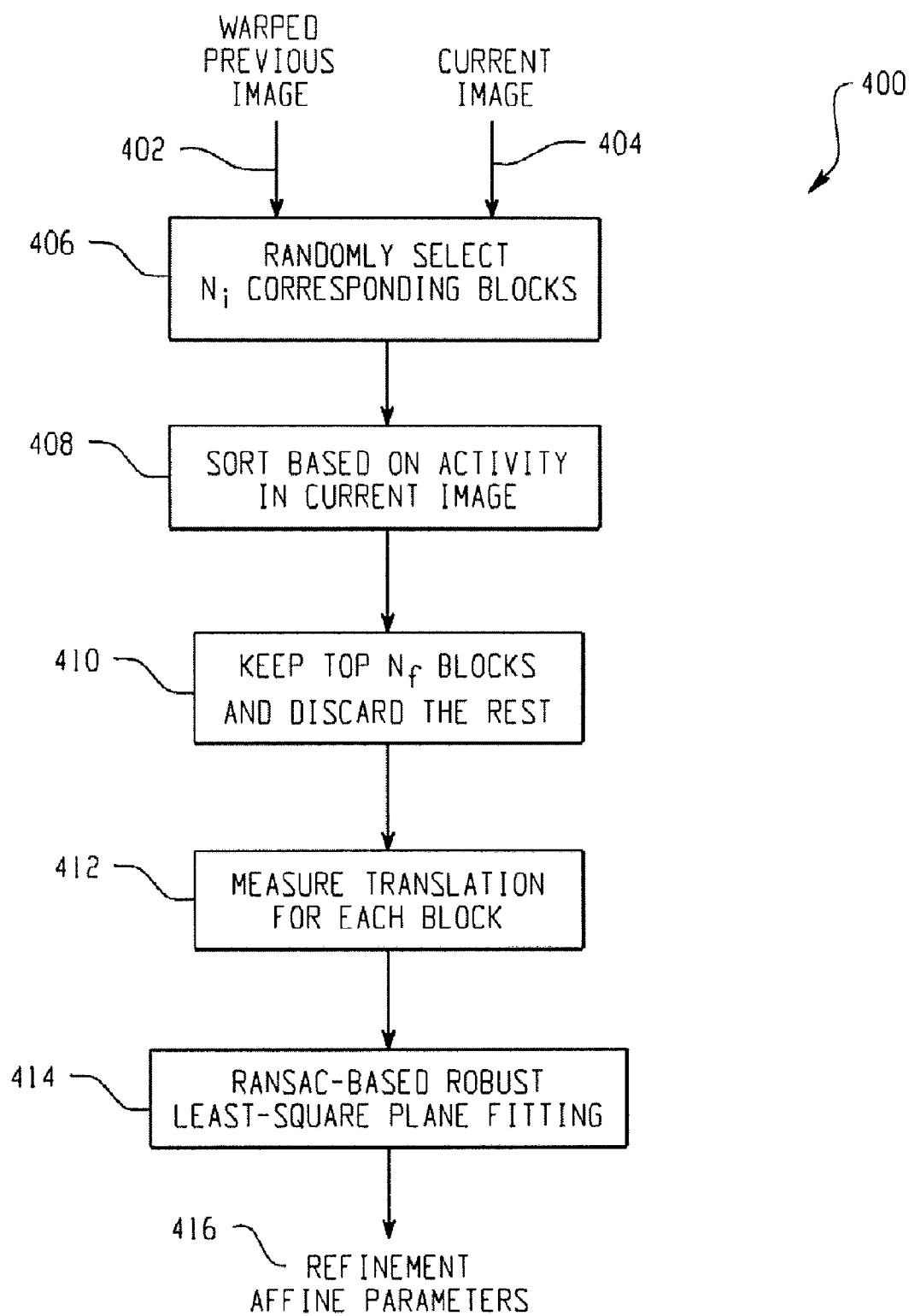
FIG. 16 is a flow diagram illustrating a process for calculating refinement affine parameters.

FIG. 16 is a flow diagram illustrating a process for calculating refinement affine parameters. Following receipt of the current image 404 and the previous image warped according to the phase plane correlation estimate, a number $N_i$ of corresponding blocks from the warped image 402 and current image 404 are selected in step 406. More specifically, a set of $N_i$ random blocks is selected from the current image 404 that also have corresponding blocks in the warped previous image 402. The selection of random blocks in step 406 tends to alleviate the problem of some new image regions appearing in an image frame and old regions disappearing from the image frame. The distribution of probability of selecting a block from a region in an image may be configured to be non-uniform if some known segmentation information is available, so as to avoid selecting blocks from image regions which do not follow the global motion pattern. In practice, it is not necessary to pre-warp the entire previous image before starting the refinement stage, as it is sufficient to warp only those parts of the previous image which are selected to participate in the refinement.

The selected blocks are sorted based upon their level of activity in step 408. In general, activity may be measured as a sum of absolute difference from the mean, variance, or eigenvalues of a windowed image second moment matrix. These three metrics are listed in increasing order of computational complexity but also in increasing order of reliability. Another possibility is to look for a significant bi-direction intensity gradient inside a block. The sorting is intended to identify promising blocks for motion estimation because low activity blocks are likely to give incorrect motion vectors due to aperture affect. The top $N_f$ blocks from the sorted list are considered promising blocks and are kept under consideration in step 410 while the remaining blocks are discarded. Thus, an adaptive threshold on the activity is implicitly applied.

The translation between each of the high activity Nf promising blocks in the current frame and its counterpart in the previous frame is measured in step 412 based upon the phase correlation values calculated before. Phase-correlation provides two advantages as compared to other methods, in this regard. First, phase correlation measures sub-pixel-accurate translation with reasonably small amount of computations. Second, the translation measurement result is almost independent of minority outlier pixels, which may be due to foreground pixels. When neither background nor foreground is dominant, it gives two motion vectors, one corresponding to each.

After translation measurement is completed in step 412, the data is passed to a RANSAC-based robust least-square model for fitting in step 414 as a set of $N_f$ pentuples (x,y,1, dx,dy), where x,y is the coordinate of the center of the block, dx is the translation of the block along the x-axis, and dy is the translation of the block along the y axis. Step 414 is described in further detail with reference to FIG. 17 below. Following fitting in step 414, the refinement affine parameters 416 are output to be utilized in generating a motion vector estimate.

Figure 17:
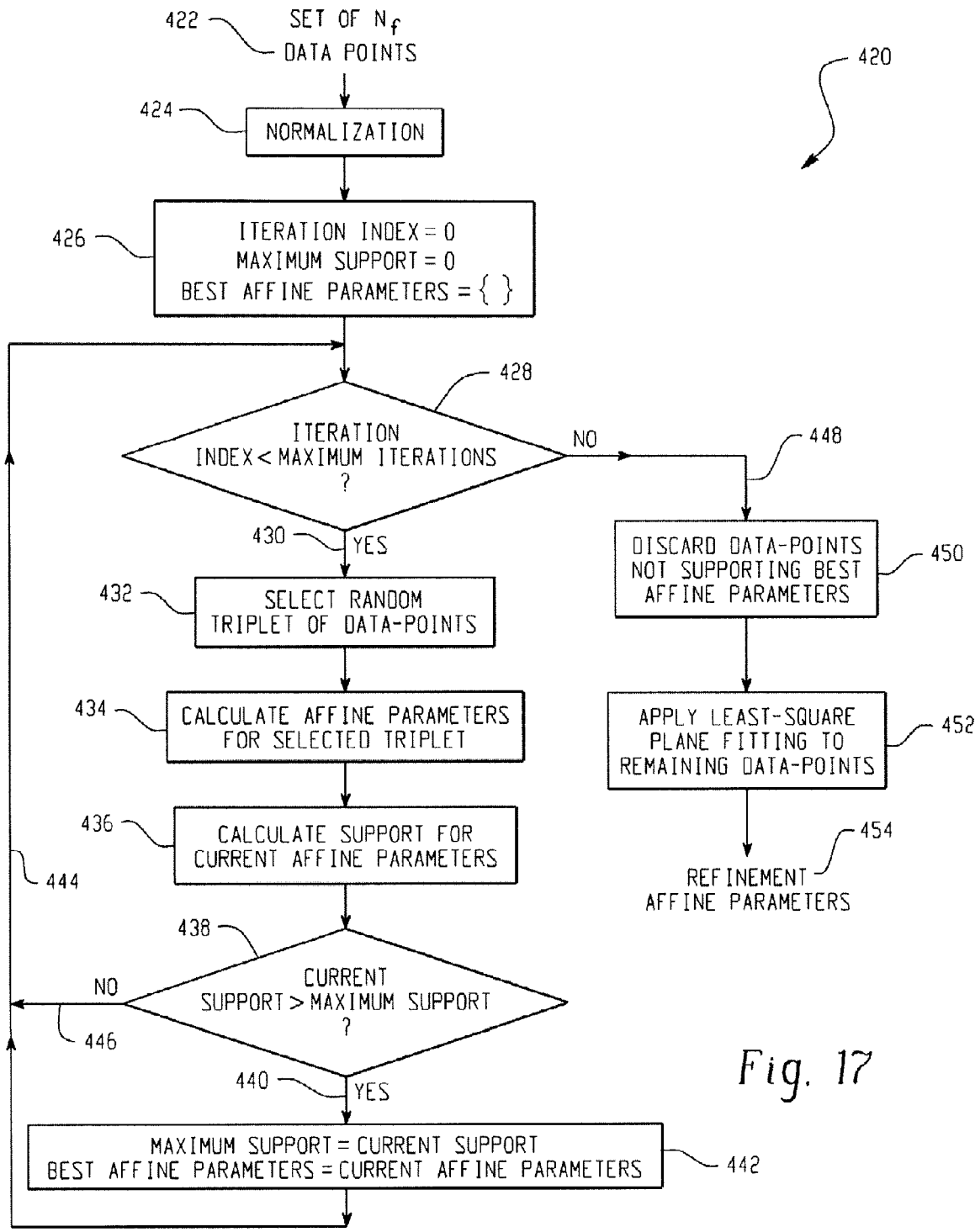
FIG. 17 is a flow chart illustrating a process for calculating refinement affine parameters.

FIG. 17 is a flow chart illustrating a process 420 for calculating refinement affine parameters. The process of FIG. 17 begins with the receipt of a set of $N_f$ data-points 422 and a normalization procedure 424. The iteration index and maximum support variables are reset to zero and the best affine parameters array is reset in step 426. A loop begins at step 428 with an inquiry to check that a maximum number of iterations has not been met. If a maximum number of iterations have not been completed, a random triplet of data-points is selected in step 432. Three data-points are selected because three-point correspondences completely define the affine transformation as long as the three points are not collinear. Each time through the loop, the selected three data-points uniquely determine a set of affine parameters. The calculation of the affine parameters in step 434 may be calculated using the following relationship:

$$\left[(A - I_2) \middle| \frac{B}{k}\right] = \begin{bmatrix} dx_1 & dx_2 & dx_3 \\ dy_1 & dy_2 & dy_3 \end{bmatrix} \begin{bmatrix} x_1 & x_2 & x_3 \\ y_1 & y_2 & y_3 \\ k & k & k \end{bmatrix}^{-1},$$

where $I_2$ is a 2×2 identity matrix.

The parameter values that are calculated in step 434 may not be consistent with affine parameters calculated over previous iterations of the loop beginning at step 428. If a data-point is consistent with a particular value of affine parameters, then it is said to be in the support set of the affine parameter. Support for the current affine parameters is calculated in step 436. The number of supporting data-points, which exhibit a motion vector consistent with the currently determined affine parameters, is computed by counting the number of data-points for which the norm (e.g., $L_1$ or $L_2$) of the following error metric is below a suitable threshold:

$$e = \begin{bmatrix} dx \\ dy \end{bmatrix} - \begin{bmatrix} (A - I_2) \Big| \frac{B}{k} \end{bmatrix} \begin{bmatrix} x \\ y \\ k \end{bmatrix}.$$

The "best affine parameter" refers to that value of affine parameters encountered so far that had the largest support set. The size of the support set for the best affine parameter is stored in the max support variable. Thus, in step 438, an inquiry is made as to whether the support for the current affine parameters is greater than the value stored in the max support variable. If the current support is greater, the max support value is changed to the current support value, and the best affine parameters array is reset to the current affine parameters value in step 442. If the current support is not greater, then the current max support and best affine parameters values are maintained. In either case, the iteration index is incremented and the loop is restarted as long as the iteration index is less than the max iterations value.

Once the iteration index is equal to the maximum iterations value, branch 448 is taken and data-points not supporting the best affine parameters are discarded in step 450. A least-square plane fitting is applied to the retained data-points in step 452 to determine the refined affine parameters 454 which are utilized to generate an estimated motion vector.

Figure 18:
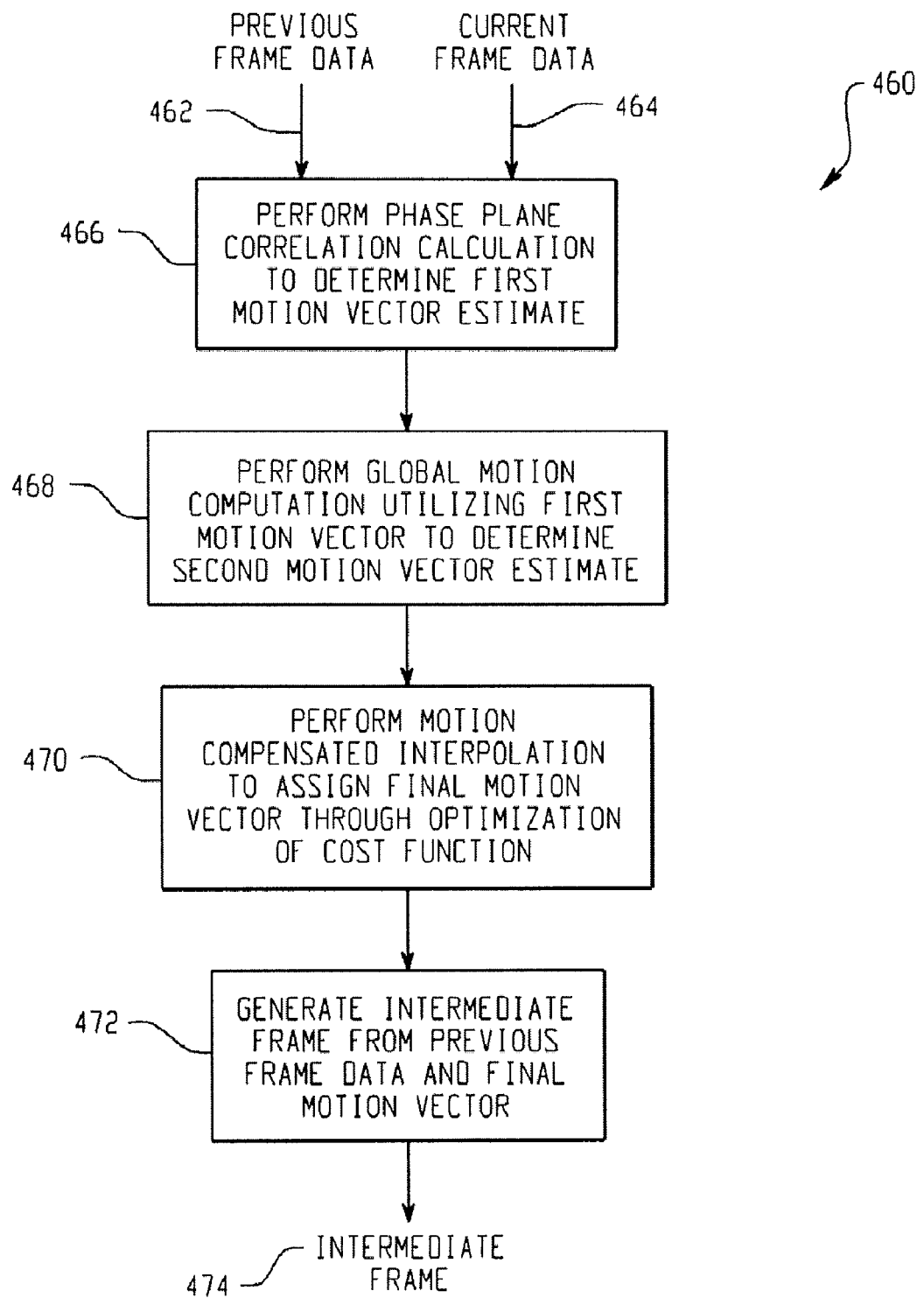
FIG. 18 is a flow diagram illustrating a process for generating an intermediate frame from previous frame data and current frame data.

FIG. 18 is a flow diagram illustrating a process 460 for generating an intermediate frame from previous frame data 462 and current frame data 464. At step 466, previous frame data 462 and current frame data 464 are received and a phase plane correlation calculation is performed to determine a first motion vector estimate. The first motion vector estimate is then utilized to perform a global motion computation to determine a second motion vector estimate in step 468. In step 470, a motion compensated interpolation is performed to assign a final motion vector through optimization of a cost function. This motion compensated interpolation step 470 may utilize at least one of the first motion vector estimate and the second motion vector estimate. The assigned final motion vector and previous frame data are then used in step 472 to generate an intermediate frame 474.

FIG. 19 is an illustration of a motion hole. As described previously, the determined final motion vector may not be valid for all pixels of the generated intermediate frame. These anomalies tend to occur near edges of objects moving in a video. FIG. 19 depicts a motion hole that results from the invalidity of a final motion vector. The original shape is shown at 512, and the original shape missing a region due to a motion hole is depicted at 514. To prevent the motion hole from appearing in the intermediate frame, error correction procedures may be performed.

Figure 20:
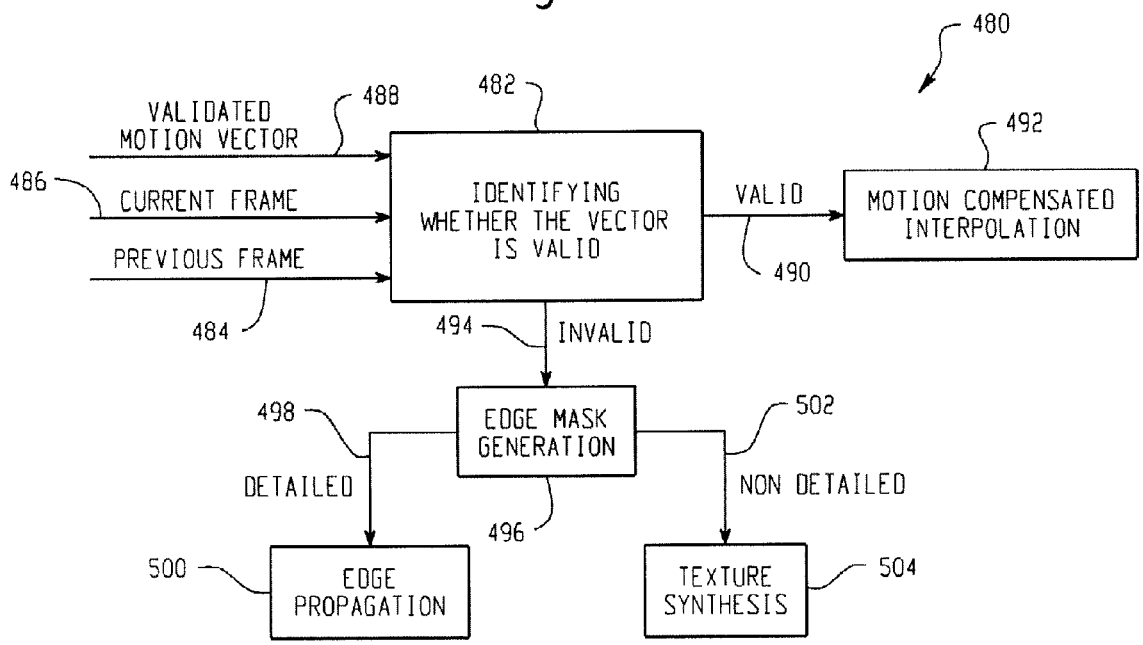
FIG. 20 is a flow diagram illustrating an error concealment technique.

FIG. 20 is a flow diagram 480 illustrating an error concealment technique. Block 482 receives the validated motion vector 488 for a pixel or group of pixels from the VMV engine as well as current frame data 486 and previous frame data 484. A determination is made in the block 482 as to whether the vector is valid. If the vector is found to be valid 490, then motion compensated interpolation is performed at 492. If the vector is found to be invalid 494, then edge mask generation error compensation 496 may be performed. Two different types of error compensation may be performed. If the area under consideration is considered detailed, such as a part of an edge between two objects in a video, then branch 498 is taken and an edge propagation technique 500 is performed. If the area under consideration is considered non-detailed, such as an area away from a transition between objects in a video, then branch 502 is taken and a texture synthesis technique 504 is performed.

Figure 21:
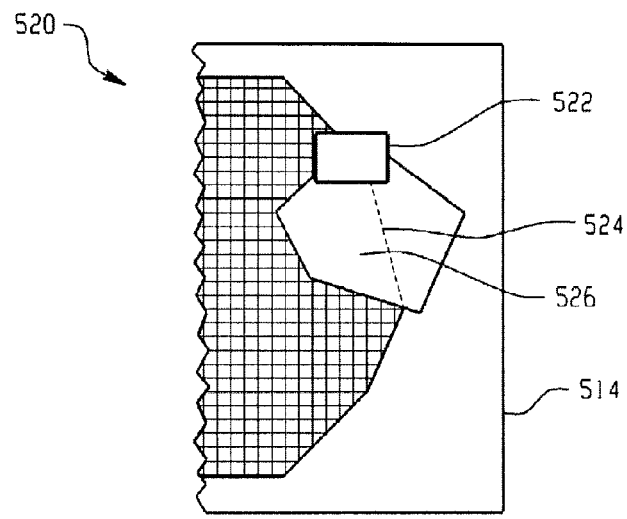
FIG. 21 is a further illustration of a motion hole requiring error compensation.

FIG. 21 further illustrates a motion hole requiring error compensation 520. A block 522 highlights an area that requires an error compensation procedure. The block 522 includes some detailed portions in the shape edge as well as some non-detailed portions in the fill in regions inside and outside of the shape.

The detailed portion of the target area 522 has an edge propagation technique applied. An edge map of the data is analyzed and the direction of the edge is computed in the neighborhood region near the target area 522. Often, an edge direction is consistent over small distances. Thus, the edge pixels are copied from the neighborhood region and filled in the hole based on a sum of squared differences or other matching criteria. Because detailed regions tend to have more information in the neighboring regions, edge propagation may be performed before texture syntheses. Thus, the entire edge 524 may be restored prior to addressing any regions that require texture filling 526.

Figure 22:
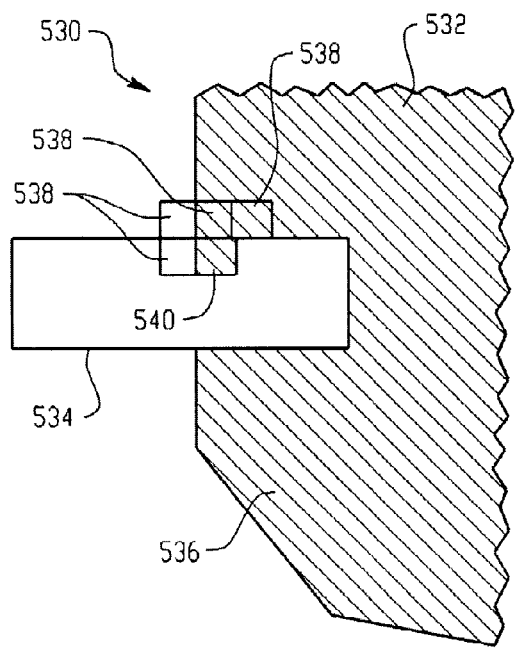
FIG. 22 is an illustration of texture synthesis during an error concealment operation.

FIG. 22 is an illustration 530 of texture synthesis during an error concealment operation. Typically, non-detailed regions contains textures. Texture synthesis may be accomplished using a variety of techniques. In the technique of FIG. 22, a poll is taken of blocks surrounding a portion of the fill region 534 to generate a set of candidate blocks 538. Based on the location of edges and the content of surrounding blocks, a best match 540 is selected to be incorporated into the target area. Other more advanced techniques may take into account the periodicity of the surrounding textures as well as other parameters of the surrounding region.

Figure 23:
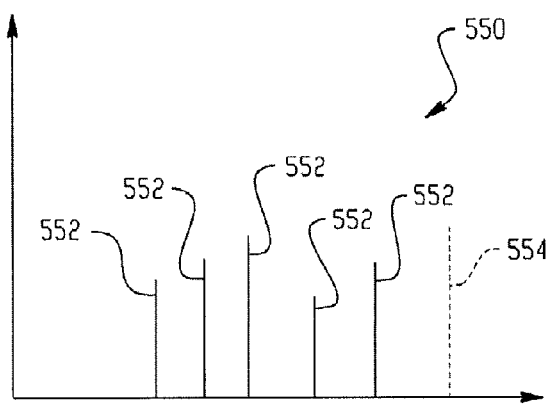
FIG. 23 is an illustration of texture synthesis based on the Markov model.

One such advanced technique is depicted in FIG. 23. FIG. 23 is an illustration 550 of texture synthesis based on the Markov model. Under the Markov model, it is assumed that the texture to be filled in is random. The values of a number of surrounding pixels 552 that are not part of the motion hole are examined. The Markov model uses a probabilistic process to generate a most probable value 554 for the pixel of concern based on the value of surrounding pixels. This most probable value is then applied, and the process may be repeated for the remainder of the non-detailed target area to be filled.

Figure 24:
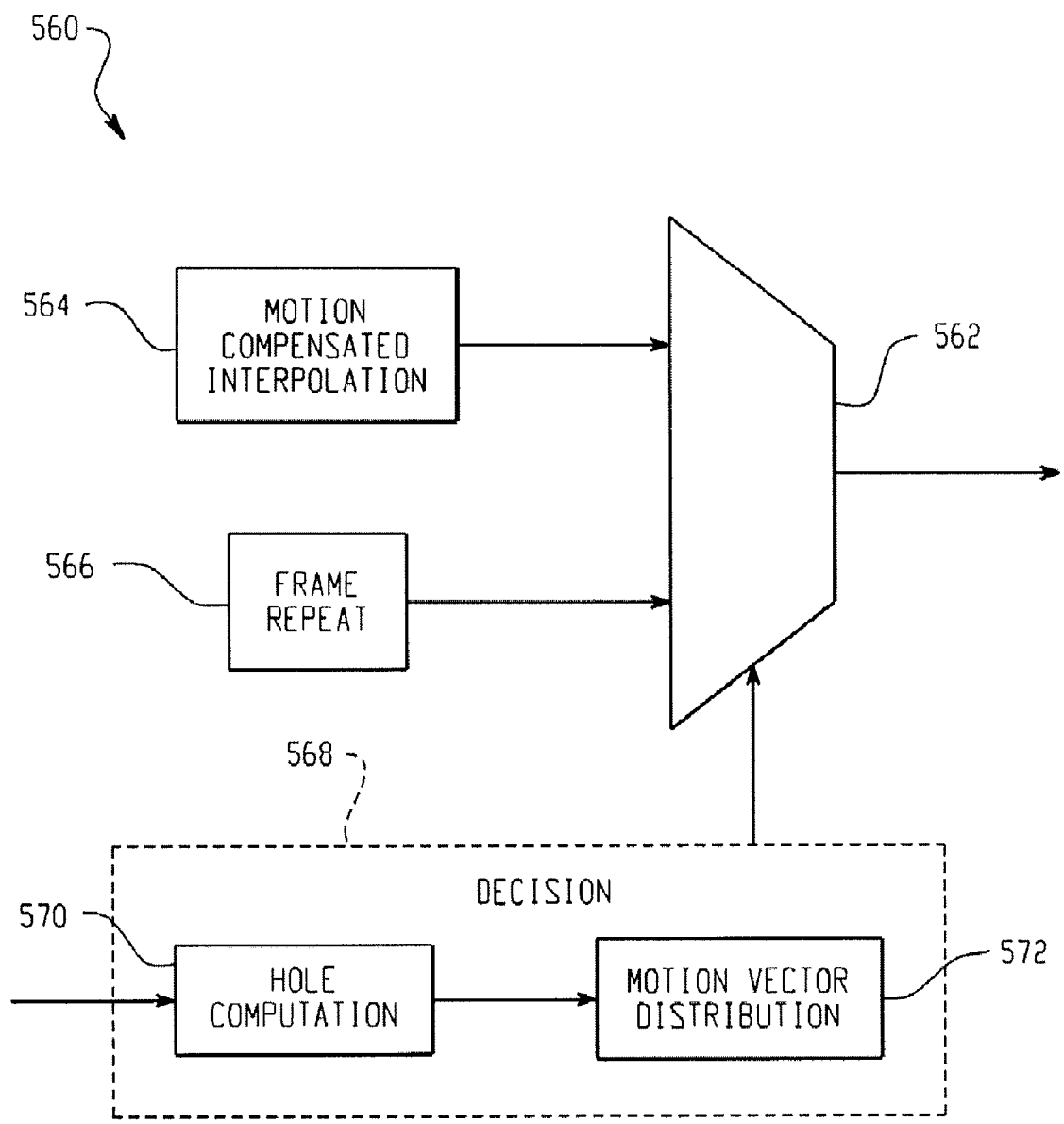
FIG. 24 is a flow diagram illustrating a final image synthesis decision.

While insertion of a motion compensated intermediate frame into an up-converted target video often improves the target video by increasing sharpness and reducing blur and judder, sometimes it may be preferable to repeat the previous frame when up-converting rather than using the motion interpolated frame. FIG. 24 is a flow diagram 560 illustrating a final image synthesis decision. In FIG. 24, a multiplexer 562 selects between a motion compensated interpolated frame 564 and a repeat of the previous frame 566 based on a variety of criteria 568. For example, a calculation of the number of motion holes 570 created in generating the intermediate frame may be considered. Additionally, a quality of error compensation may be computed and considered in the decision whether to use the generated intermediate frame. Further, the magnitude of the final motion vectors 572 utilized in generating the intermediate frame may also be considered. If the magnitude of the motion vectors is small, then the advantage of the motion compensation may be nullified by any errors in the final compensated image. Thus, the statistical distribution 572 of the magnitude of the motion vectors may be considered in the decision.

Figure 25:
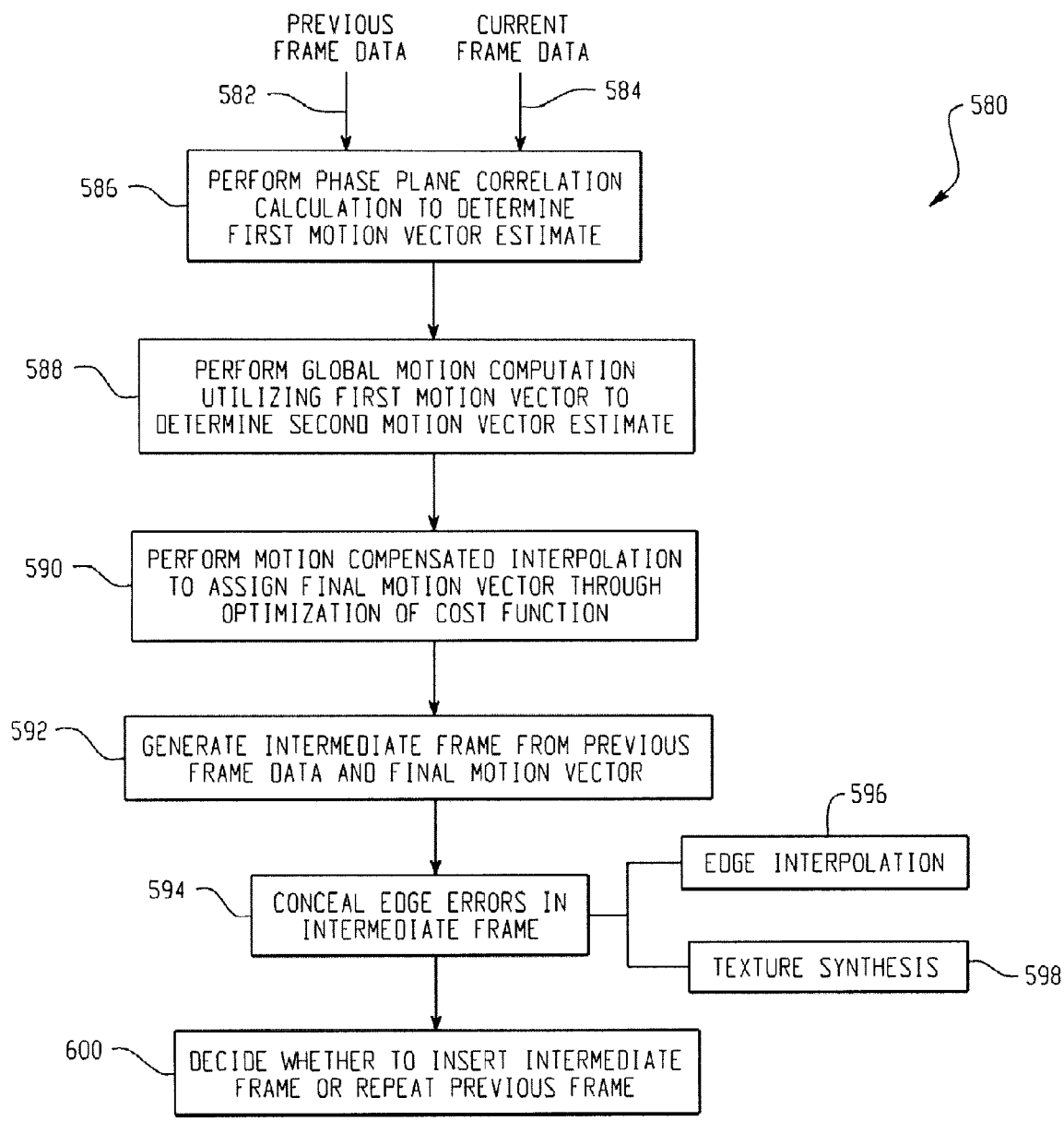
FIG. 25 is a flow diagram illustrating a process for generating an interpolated frame from previous frame data and current frame data input and deciding whether to use the interpolated frame in a target video.

FIG. 25 is a flow diagram 580 illustrating a process for generating an interpolated frame from previous frame data 582 and current frame data 584 input and deciding whether to use the interpolated frame in a target video. The example of FIG. 25 begins at 586 where previous frame data 582 and current frame data 584 are received, and a phase plane correlation calculation is performed to determine a first motion vector estimate. A global motion computation is then performed at step 588 utilizing the first motion vector to determine a second motion vector estimate. At step 590, a motion compensated interpolation is performed to assign a final motion vector via optimization of a cost function 590. Using the final motion vector and the previous frame data 582, an intermediate frame is generated in step 592. Following generation of an intermediate frame in step 592, an edge error concealing procedure is applied to the intermediate frame in step 594. The edge error concealment step may include an edge interpolation procedure 596 as well as a texture synthesis procedure 598. After the error concealment is complete, a decision whether to insert the intermediate frame in the target video or to repeat the previous frame in the target video is computed at step 600.

This written description uses examples to disclose the invention, including the best mode, and also to enable a person skilled in the art to make and use the invention. The patentable scope of the invention may include other examples.

It is claimed:

1. A system for converting a picture frame rate between a source video at a first rate and a target video at a second rate, the system comprising:
   a phase plane correlation calculator configured to determine a first motion vector estimate based on previous frame data and current frame data;
   a global motion calculator configured to determine a second motion vector estimate based on the previous frame data, the current frame data, and the first motion vector estimate;
   wherein at least one of the first motion vector estimate and the second motion vector estimate is used to interpolate an intermediate frame; and
   a motion compensated interpolator configured to assign a final motion vector through a quality calculation that utilizes data from the first motion vector estimate and the second motion vector estimate.

2. The system of claim 1, further comprising:
   an intermediate frame generator configured to generate the intermediate frame utilizing the final motion vector.

3. A system for converting a picture frame rate between a source video at a first rate and a target video at a second rate, the system comprising:
   a phase plane correlation calculator configured to determine a first motion vector estimate based on previous frame data and current frame data; and
   a global motion calculator configured to determine a second motion vector estimate based on the previous frame data, the current frame data, and the first motion vector estimate, wherein the global motion calculator comprises:
      an initial estimator that generates an global parameter estimate based on the first motion vector estimate, and
      a parameter refiner that refines the global parameter estimate based on the previous frame data and the current frame data to produce a final affine parameter, wherein the final affine parameter is utilized to generate the second motion vector estimate;
   wherein at least one of the first motion vector estimate and the second motion vector estimate is used to interpolate an intermediate frame.

4. The system of claim 3, wherein the initial estimator estimates a parameter of an affine model, wherein the parameter refiner refines the parameter of the affine model based on the previous frame data and the current frame data.

5. The method of claim 4, wherein the parameter refiner refines the parameter of the affine model through an iterative process utilizing different data points for each iteration to calculate an intermediate affine parameter for each iteration, wherein the intermediate affine parameter that receives maximum support through the iterations is selected as the final affine parameter.

6. The method of claim 5, wherein a first intermediate affine parameter supports a second intermediate affine parameter if the first intermediate affine parameter is within a range centered around the second intermediate affine parameter.

7. The method of claim 6, wherein the different data points are selected at random.

8. A system for converting a picture frame rate between a source video at a first rate and a target video at a second rate, the system comprising:
   a phase plane correlation calculator configured to determine a first motion vector estimate based on previous frame data and current frame data; and
   a global motion calculator configured to:
      (i) select a plurality of pixel groups at random from the previous frame data and corresponding pixel groups from the current frame data, wherein pixel groups exhibiting high levels of activity from the previous frame data to the current frame data are retained,
      (ii) calculate a motion parameter for each retained pixel group corresponding to movement of the retained pixel group, and
      (iii) generate the second motion vector estimate based on the calculated motion parameter;
   wherein at least one of the first motion vector estimate and the second motion vector estimate is used to interpolate an intermediate frame.

9. The method of claim 8, wherein the global motion calculator utilizes the first motion vector as an initial guess in an affine model represented by:

$$X'=A*X+B,$$

wherein $X=[x,y]T$ represents a position of a selected pixel group in a previous frame;
   wherein $X'=[x',y']T$ represents a position of a selected pixel group in a current frame;
   wherein represents motion parameters corresponding to zoom and rotation of the selected pixel group from the previous frame to the current frame;
   wherein $B=[bx, by]T$ represents motion parameters corresponding to pan motion of the pixel group from the previous frame to the current frame.

10. A method of picture frame rate conversion between a source video and a target video, the method comprising:
    receiving previous frame data and current frame data;
    performing a phase plane correlation calculation utilizing the previous frame data and the current frame data to determine a first motion vector estimate;
    performing a global motion computation utilizing the previous frame data, the current frame data, and the first motion vector estimate to determine a second motion vector estimate;

performing a motion compensated interpolation to assign a final motion vector through a quality calculation that utilizes data from the first motion vector estimate and the second motion vector estimate; and generating the intermediate frame utilizing the previous frame data and the final motion vector.

11. The method of claim 10, wherein performing a global motion computation further comprises:

generating an initial estimate of a global parameter based on the first motion vector estimate;

refining the global parameter estimate based on the previous frame data and the current frame data to produce a final affine parameter; and generating the second motion vector estimate utilizing the final affine parameter.

12. The method of claim 11, wherein the global parameter estimate is a parameter of an affine model, wherein the parameter of the affine model is refined based on the previous frame data and the current frame data.

13. The method of claim 12, wherein refining the global parameter estimate utilizes an iterative process using different data points for each iteration to calculate an intermediate affine parameter for each iteration, wherein the intermediate affine parameter that receives maximum support through the iterations is selected as the final affine parameter.

14. The method of claim 13, wherein a first intermediate affine parameter supports a second intermediate affine parameter if the first intermediate affine parameter is within a range centered around the second intermediate affine parameter.

15. The method of claim 13, wherein the different data points are selected at random.

16. The method of claim 10, wherein performing a global motion computation further comprises:

selecting a plurality of pixel groups at random from the previous frame data and corresponding pixel groups from the current frame data;

calculating a motion parameter for each selected pixel group corresponding to movement of the pixel group; and generating the second motion vector estimate based on the calculated motion parameter.

17. The method of claim 16, wherein performing a global motion computation further comprises:

calculating a level of activity for each of the plurality of selected pixel groups;

retaining a portion of the plurality of selected pixel, the retained portion corresponding to pixel groups having a high level of activity.

18. The method of claim 17, wherein the level of activity is measured as sum of absolute difference from a mean or a variance or eigenvalues of a windowed image second moment matrix.

19. The method of claim 16, wherein of calculating the motion parameter utilizes an affine model that uses the first motion vector estimate as an initial guess.

* * * * *